United States Patent [19]
Gerdes

[11] Patent Number: 5,184,218
[45] Date of Patent: Feb. 2, 1993

[54] BANDWIDTH COMPRESSION AND EXPANSION SYSTEM

[75] Inventor: Richard C. Gerdes, Scottsdale, Ariz.

[73] Assignee: WavePhore, Inc., Tempe, Ariz.

[21] Appl. No.: 725,563

[22] Filed: Jul. 3, 1991

[51] Int. Cl.⁵ .......................... H04N 7/01; H04N 7/12
[52] U.S. Cl. ..................................... 358/133; 358/138; 358/140
[58] Field of Search ........................ 358/138, 133, 140

[56] References Cited

U.S. PATENT DOCUMENTS

| | | | |
|---|---|---|---|
| 2,921,124 | 1/1960 | Graham | 358/138 |
| 4,268,861 | 5/1981 | Schreiber | 358/138 |
| 4,987,480 | 1/1991 | Lippman | 358/133 |

OTHER PUBLICATIONS

"Genesys: Transmission System for HDTV".
Gerdes, Richard, "Using Genesys TM HDTV Technologies for Today's Expanded NTSC Service". Presented at 1990 Spring Engineering Conference, Nat'l Assoc. of Broadcasters, Apr. 1, 1990. Atlanta, Ga.
Gerdes, Richard. "Waveform Modulation as Used in Television Applications", Presented at RF Technology Expo 90, Mar. 28, 1990, Anaheim, Calif.
Gerdes, Richard. "Genesys TM HDTV Technologies Expand Existing NTSC Service". Presented at The 24th Annual SMPTE Television Conference, Society of Motion Picture and Television Engineers, Jan. 26, 1990. Lake Buena Vista, Fla.
Gerdes, Richard. "Arizona Based HDTV; The Genesys TM Technologies". Presented at Phoenix Chapter of the Society of Broadcast Engineers, Arizona Broadcasters Association Fall Meeting, Nov. 10, 1989, Phoenix, Ariz.
Gerdes, Richard. "HDTV Management Timetable". Presented at Challenges in Teleproduction, The Internat'l Teleproduction Society Annual Forum, Sep. 17, 1989, Los Angeles, Calif.
Gerdes, Richard. "The Use of Genesys Technology for HDTV". Presented at the 130th SMPTE Technical Conference, Society of Motion Picture and Television Engineers, Inc., Oct. 15–19, 1988. New York, NY.

Primary Examiner—Howard W. Britton
Attorney, Agent, or Firm—Spensley Horn Jubas & Lubitz

[57] ABSTRACT

A bandwidth compression and expansion system is provided in which analog data is processed in real time using a sub-sampling technique in which pixels or other data values within a sub-sampling region determine the value of a corresponding signal which also denotes trends or patterns in accordance with the other pixels or signal values within a sampling region encompassing the sub-sampling region. Neural networks are used to implement the sub-sampling process both during bandwidth compression and during bandwidth expansion in which interpolation and extrapolation are employed to reverse the sub-sampling process used during compression. The neural network forms part of an arrangement in which analog input signals are converted to digital signals that are then stored in a random access memory which operates in conjunction with an address generator for identifying a succession of sampling and sub-sampling regions within the memory. The output of the memory is converted to an analog signal before being held in a sample and hold memory for use in the neural network.

31 Claims, 12 Drawing Sheets

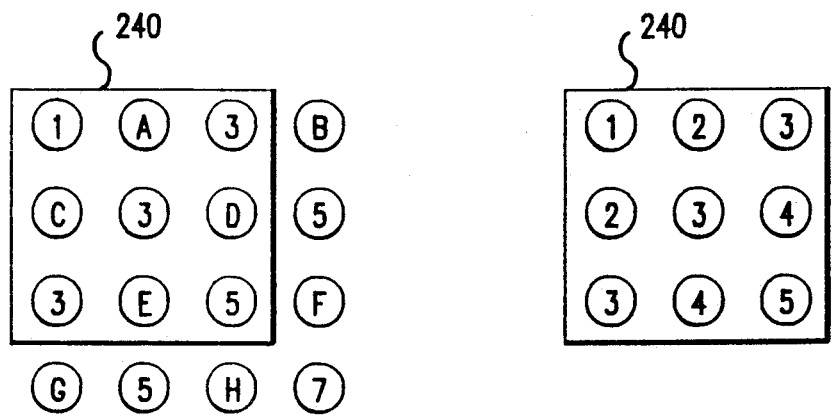
FIG.-21C
FIG.-21D
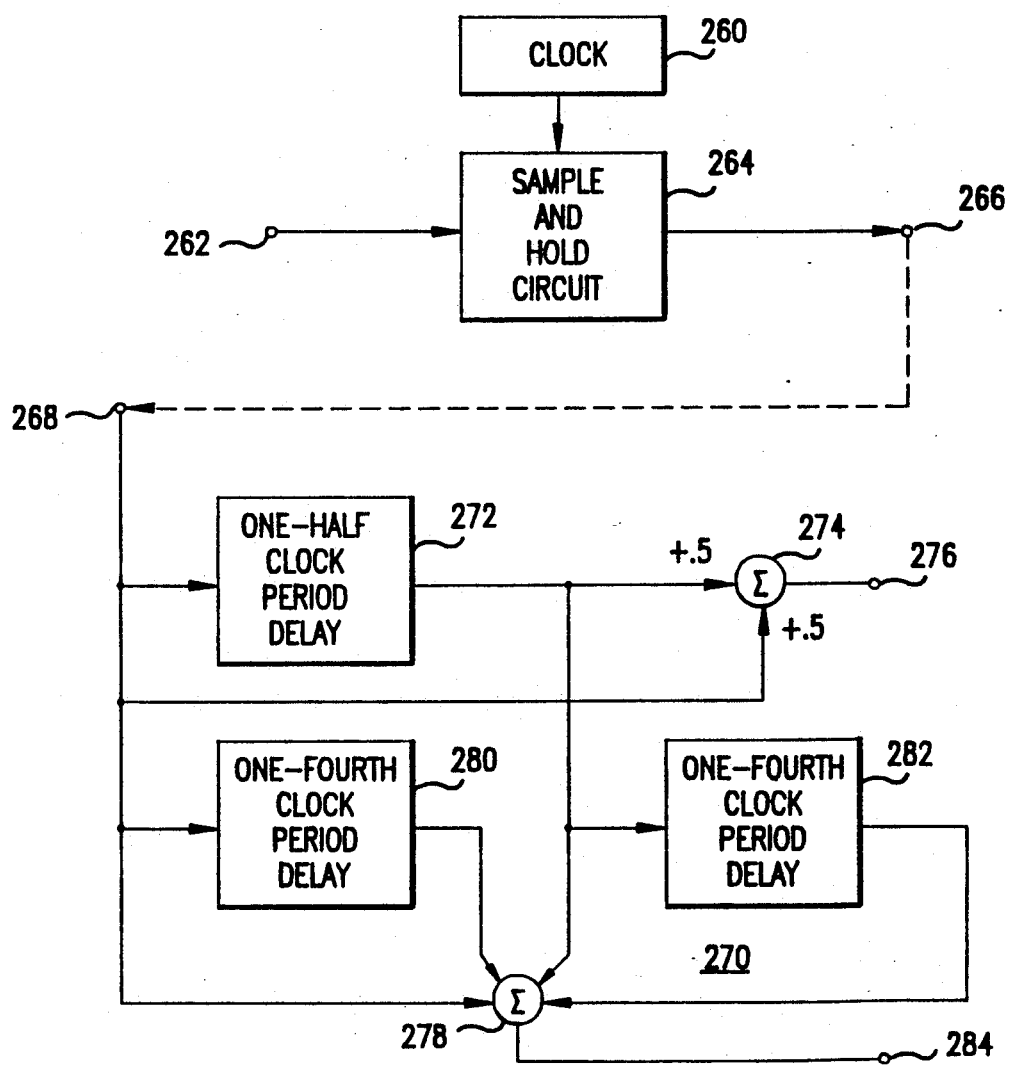
FIG.-22

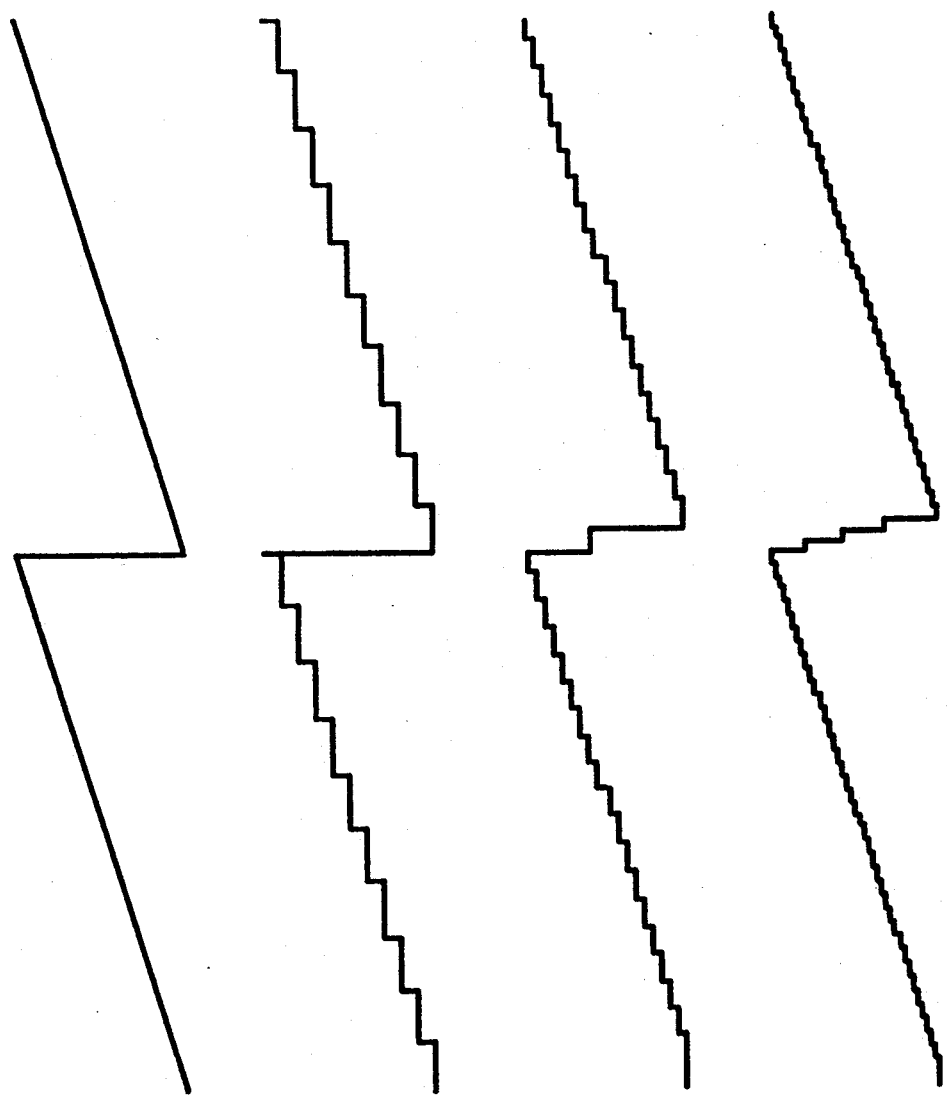

BANDWIDTH COMPRESSION AND EXPANSION SYSTEM

BACKGROUND OF THE INVENTION

1. Field of the Invention

The present invention relates to bandwidth compression and expansion systems, and more particularly to systems for processing signals such as audio and video signals which can be bandwidth compressed for transmission or other processing followed by decompression or other expansion.

2. History of the Prior Art

It is well known in the transmission of certain signals such as video and audio signals to compress the signal bandwidth for purposes of such transmission. At the receiving end, the transmitted signals are subjected to a decompression process to produce a signal which is a close approximation of the original signal transmitted.

A number of different compression and expansion techniques are commonly employed in connection with the transmission or other processing of certain signals. In the case of audio and video signals, for example, the human ear and the human eye cannot perceive certain differences or changes in such signals. Therefor, it is often possible to selectively sample the signal information and to transmit only the sampled information to the exclusion of the other information contained within the signal. Interpolation or extrapolation techniques may then be used to produce an audio or video signal which is a reasonably close approximation of the original audio or video signal transmitted. In most instances the human ear and the human eye cannot detect differences or aberrations in the decompressed signal.

Examples of conventional systems for processing audio and video signals and the like are provided by several publications which include pages 77–82 of *Digital Image Processing* by William B. Green, pages 238–243 of *Digital Filters and Signal Processing* by Leland B. Jackson, and pages 320–323 and 494–497 of *Digital Coding of Waveforms* by Jayant and Noll.

Conventional bandwidth compression and expansion systems for the processing of video signals typically sample only certain pixels to the exclusion of all others and then rely upon interpolation of extrapolation to reconstruct the complete video signal at the receiving end. Typically, only every third or fourth pixel of the video image is sampled and stored, with the result that as much as 75% or more of the information contained within such signal is thereby discarded or thrown away. This occasionally results in variations or aberrations in the transmitted signal which are noticeable to the viewer. It is particularly troublesome in the case of certain shapes or patterns within the picture that cannot be accurately reproduced where the intervening pixel information between the sampled data is missing. Still further problems arise because of the inability of such conventional systems to process the information in real time. Typically, the two different fields of each picture frame are examined and sampled, with as many as eight fields being examined because of the rapidly occurring frames and the time required to accomplish such processing. As a result, temporal filtering sometimes occurs in which signal processing takes place within a void between samples so that the moving picture is lost. Still other problems occur in areas such as high definition television where a larger than normal amount of picture information must be transmitted or otherwise processed in a manner so that the enhanced picture information is not lost.

It would therefore be advantageous to be able to process signals such as video signals in real time. This would enable each frame of a video signal or other visual signal, for example, to be compressed, expanded or otherwise processed as the frame occurs or is presented, thereby eliminating the need for simultaneous processing of the fields of different images with the consequent loss of motion or other problems which sometimes occur. It would also be advantageous to provide a compression scheme or similar signal processing scheme in which all of the pixels or other signal values of the signal being processed are examined and used in generating the compressed signal, rather than large portions of such signal information simply being discarded. It would still further be advantageous to provide signal expansion apparatus which can be used for image enhancement such as in the case of a synthesizer, in which the aspect ratio of an image can be changed where desired.

BRIEF DESCRIPTION OF THE INVENTION

The foregoing and other objects and features in accordance with the invention are accomplished by providing a bandwidth compression and expansion system capable of processing signals in real time. The signals are processed using a subsampling technique in which the pixels or other signal values within a succession of subsampling regions are utilized as the primary source of information in generating a compressed signal representative thereof. At the same time, however, the remaining pixels or signal values within each sampling region outside of the subsampling region therein are observed and are used to denote trends or patterns in the signal values in the compressed signal being generated. Following transmission or other processing of the compressed signal, such signal may be expanded using interpolation and extrapolation.

The subsampling technique provides for signal expansion in a manner enabling image enhancement. The enhanced image can be provided with a different aspect ratio than the aspect ratio of the image signal from which it is derived. Such features can be utilized, for example, in providing a wide screen or high definition television synthesizer.

In bandwidth compression and expansion systems according to the invention, the subsampling technique may advantageously be implemented using a modified neural network. The analog signal to be processed, which signal can comprise an audio signal, a video or other visual signal, or other analog signal, is converted to a corresponding digital signal by an analog to digital converter and is stored in a random access memory. An address generator identifies a succession of subsampling regions and corresponding sampling regions within which the subsampling regions are located, within the random access memory. Signal values such as pixels within the sampling regions are converted to analog signals by a digital to analog converter before being stored in an analog sample and hold memory to which the neural network is coupled. The neural network, which implements the subsampling algorithm, processes the analog signals stored in the sample and hold memory by generating a signal in response to each subsampling region. Each such signal has a value corresponding to the values of the pixels or other signal values within the subsampling region and also has a value denoting trends or patterns as determined by an examination of the signal values outside of the subsampling region but within the encompassing sampling region.

Where video or other image signals are being processed, the random access memory is preferably made large enough to accommodate a plurality of the different lines of the image raster. The address generator which locates the sampling and subsampling regions within the random access memory in response to the horizontal and vertical synchronizing information for the video input signal, also includes an end-of-line circuit and a bottom-of-raster circuit. The end-of-line circuit causes the address register to reposition the subsampling region within the sampling region as the ends of the lines within the random access memory are reached. The bottom-of-raster circuit enables the address generator to reposition the subsampling regions downwardly within the sampling regions as the bottom of the raster is encountered within the random access memory.

A signal which has been compressed in the manner just described can be decompressed or otherwise expanded using circuitry similar to that described in connection with the compression process. Such circuitry performs interpolation and extrapolation to fill in information removed during the compression process. The result is an expanded signal which is a close approximation of the original signal before compression.

Using expansion circuitry in accordance with the invention, the compressed signal is converted to a digital signal and stored in a random access memory which is addressed by an address generator. The address generator is provided with an end-of-line circuit and a bottom-of-raster circuit in cases where video or other image signals are being processed. The address generator locates the subsampling regions within the random access memory, and the signal values contained therein are converted to analog signals which are stored in an analog sample and hold memory coupled to a neural network. The neural network functions to expand the analog signal value representing each subsample region into essentially the same signal values or pixels that comprise such subsampling region using a process which is the reverse of the process undergone by the neural network in achieving compression.

In the case of color video or other image signals, the red, green and blue fields are processed separately in two-dimensional fashion. At the same time, however, the three-dimensional effect of the presence of the three colors is utilized by a subsampling process which simultaneously examines the signal values within the red, green and blue fields that lie within the subsampling region, so that a single signal representing the subsampling region of all three color fields is produced and utilized.

Expansion circuitry according to the invention may be advantageously utilized to provide a synthesizer for image enhancement. This is especially useful in applications where it is desired to convert a standard video signal into a high definition video signal. In such instances a selected portion of each image of the standard video signal is examined and the signal values sampled therein are expanded using the subsampling technique in the implementing neural network to produce corresponding images with the required additional signal values or pixels for high definition video. Where desired, the subsampling process is implemented in a manner which provides the high definition or other expanded or enhanced image with a different aspect ratio than the aspect ratio of the input standard video signal.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 21C is a pictorial representation similar to those of FIGS. 21A and 21B and illustrating the manner in which interpolation and extrapolation are used to determine the values of sample points eliminated from the compressed signal of FIG. 21B are determined;

FIG. 21D is a pictorial representation similar to those of FIGS. 21A, 21B and 21C and illustrating the manner in which the values of sample points determined in FIG. 21C are used to reconstruct the oblique plane of FIG. 21A;

FIG. 22 is a block diagram of a bandwidth compression and decompression system for compressing and decompressing signals as a function of time intervals defined by a system clock;

FIG. 23A is a diagrammatic plot of a substantially linear one-dimensional analog signal providing an example of a signal to be compressed and decompressed by the system of FIG. 22;

FIG. 23B is a diagrammatic plot of the signal of FIG. 23A upon compression by the system of FIG. 22;

FIG. 23C is a diagrammatic plot of the compressed signal of FIG. 23B upon being expanded by twice the resolution of the compressed signal of FIG. 23B; and FIG. 23D is a diagrammatic plot of the compressed signal of FIG. 23B upon being expanded by four times the resolution of the compressed signal of FIG. 23B.

DETAILED DESCRIPTION

Figure 1:
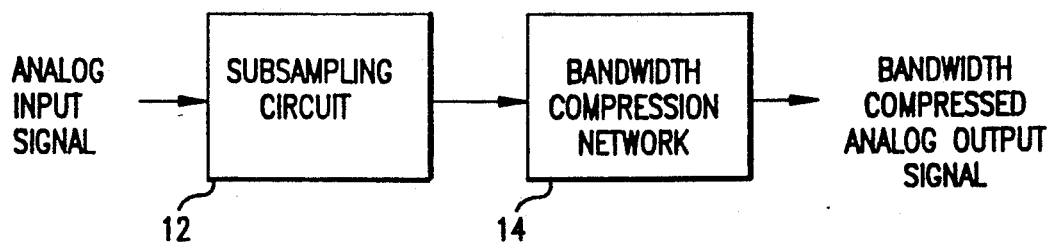
FIG. 1 is a basic block diagram of a bandwidth compression system according to the invention.

FIG. 1 shows in basic block diagram form a system 10 for compressing the bandwidth of an analog input signal in accordance with the invention. The system 10 of FIG. 1 is comprised of a subsampling circuit 12 and a bandwidth compression network 14. The analog input signal can comprise any signal of analog form which is to be bandwidth compressed for purposes of transmission or other processing of the signal. Examples of analog signals with which the system 10 of FIG. 1 may be used include audio signals and video signals. As described hereafter audio signals may be regarded as one-dimensional in nature, inasmuch as a given portion of such signal may be depicted as a single line of sample values. Video signals, on the other hand, typically comprise the successive lines of a picture in conventional raster form and therefore can be regarded as two-dimensional in nature, with horizontal and vertical dimensions. In the case of color television, the separate red, green and blue fields combine to form a three-dimensional signal.

Regardless of the nature of the analog signal applied to the bandwidth compression system 10, such signal is processed in essentially the same manner in accordance with the invention. More specifically, the signal is processed in real time using a subsampling technique which produces a signal in response to the analog values of the input signal within a subsampling region. At the same time, such signal is influenced by the analog values of the input signal within a larger sampling region which encompasses the subsampling region so as to be capable of reflecting trends or patterns in the input signal in addition to the actual values within the subsampling region. As described hereafter, bandwidth decompression is accomplished using an interpolation and extrapolation process which is essentially the reverse of the subsampling process.

The subsampling circuit 12 shown in FIG. 1 is operative to identify a succession of sampling regions of the analog input signal as well as the subsampling regions within such sampling regions. The bandwidth compression network 14 responds to the values of the analog input signal within each sampling region and included subsampling region so as to generate an output signal corresponding thereto. As previously noted, each such signal represents the values within the subsampling region as well as the trends or patterns of the analog input signal as represented by the remaining values within the sampling region. This is accomplished using a subsampling algorithm implemented by the bandwidth compression network 14. As described hereafter, the bandwidth compression network 14 can utilize a neural network for implementing the algorithm.

Figure 2:
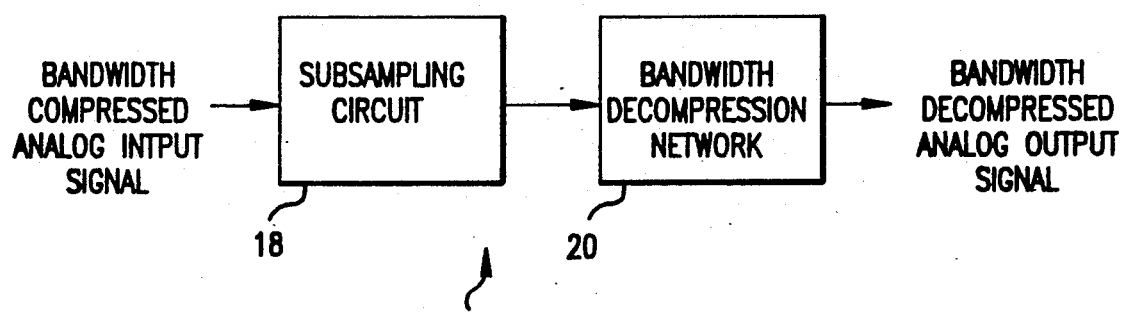
FIG. 2 is a basic block diagram of a bandwidth expansion system according to the invention.

FIG. 2 shows in basic block diagram form a bandwidth expansion system 16 according to the invention for expanding a bandwidth compressed analog input signal. The bandwidth expansion system 16 includes a subsampling circuit 18 and a bandwidth decompression network 20. The subsampling circuit 18 and the bandwidth decompression network 20 are similar to the subsampling circuit 12 and the bandwidth compression network 14 of FIG. 1, except that they essentially operate in reverse. The subsampling circuit 18 responds to the bandwidth compressed analog input signal by identifying the same sampling and subsampling regions as are utilized by the sampling circuit 12 of FIG. 1. The bandwidth decompression network 20 functions in conjunction with the subsampling circuit 18 to expand each input signal into the corresponding values within the subsampling and sampling regions using interpolation and extrapolation, as needed. The result is a bandwidth decompressed analog output signal at the output of the bandwidth decompression network 20. The bandwidth decompression network 20 implements the same subsampling algorithm as does the bandwidth compression network 14 of FIG. 1. As described hereafter, a modified neural network can be used to accomplish this.

Figure 3:
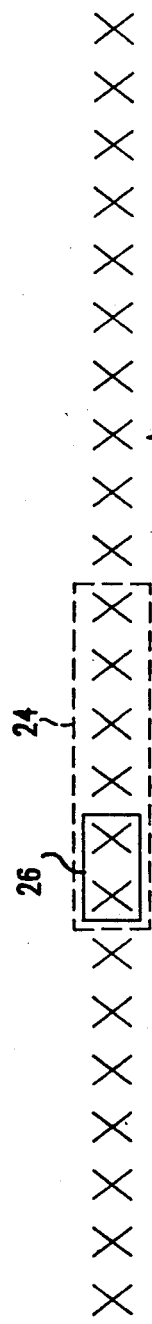
FIG. 3 is a pictorial representation of a one-dimensional line of signal values comprising an audio signal, and illustrating sampling and subsampling regions in accordance with the sub-sampling technique of the invention.

FIG. 3 represents the succession of analog values of an audio signal 22. Each of the analog values is represented by an "X" in FIG. 3. Such analog values correspond to the analog values of the audio signal 22 at each of a succession of like time intervals. Inasmuch as the audio signal 22 is represented by a single line of the analog values "X", it is considered to be a one-dimensional signal.

A sampling region 24 is shown in dotted outline in FIG. 3, while a subsampling region 26 within the sampling region 24 is shown in solid outline in FIG. 3. As shown, the sampling region 24 encompasses six of the analog values "X". The subsampling region 26 encompasses the first two of the analog values "X" at the left end of the sampling region 24. During both compression and expansion of the audio signal 22, the sampling region 24 is stepped to the right as seen in FIG. 3 in increments of two of the analog values "X". This has the effect of moving the subsampling region 26 to each of the successive pairs of analog values "X" along the audio signal 22 from left to right as seen in FIG. 3. With each relocation of the sampling region 24, the subsampling technique according to the invention generates a signal having a value which is determined by the values of the two analog values "X" within the subsampling region 26. At the same time, the subsampling algorithm is such that the generated signal also relates to the other four analog values "X" which are outside of the subsampling region 26 but within the sampling region 24. In this manner trends and patterns in the sampled signal such as the audio signal 22 are noted and represented within the generated signal. Unlike many conventional bandwidth compression systems, none of the analog values "X" are simply skipped over or "thrown away". Each analog value "X" is used in determining the signals corresponding to the sampling regions 26.

Figure 4:
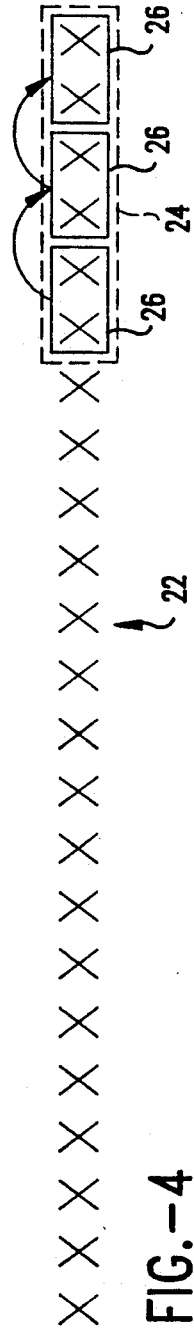
FIG. 4 is a pictorial representation similar to that of FIG. 3 but illustrating the manner in which the subsampling region can be repositioned within the sampling region when the end of the line of signal values is reached in a sampling process.

Although one-dimensional signals such as the audio signal 22 of FIG. 3 can continue virtually indefinitely, the subsampling of such signals generally requires that segments or lines of such signals be stored such as in a random access memory. Each stored line segment is sampled from left to right before the next segment of the signal is stored and sampled. In accordance with the invention, provision is made to effectively relocate the subsampling region 26 within the sampling region 24 when the right hand end of the stored line is reached. The subsampling region 26 remains at the left end of the sampling region 24 until the sampling region 24 reaches the last six analog values "X" at the right end of the stored line of analog values "X". When this occurs, and as shown in FIG. 4, provision is made to step the subsampling region 26 from the left end of the sampling region 24 to the center two analog values "X" and then to the right two analog values "X". Each time the subsampling region 26 is stepped in this fashion a corresponding signal is generated.

When the sampling of a new line of stored analog values "X" is begun, the subsampling region 26 is returned to the left end of the sampling region 24 where it remains as the sampling region 24 is stepped to the right until the last six analog values "X" are reached. The subsampling region 26 is then stepped to the center two analog values "X" and then to the right two analog values "X" in the manner just described.

Figure 5:
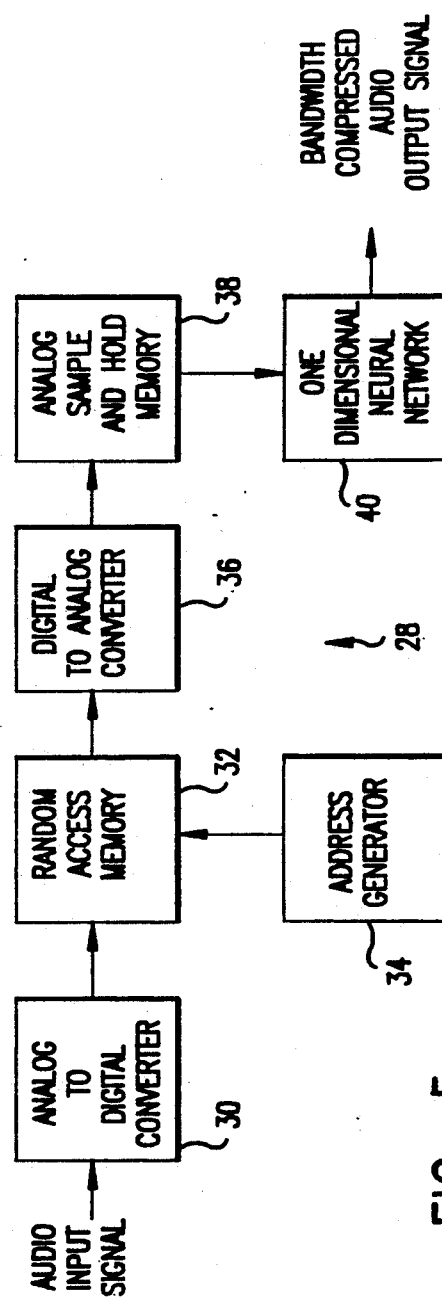
FIG. 5 is a detailed block diagram of a system according to the invention for compressing the bandwidth of a one-dimensional signal such as the audio signal pictorially represented in FIG. 3.

FIG. 5 comprises an example of the bandwidth compression system 10 of FIG. 1 for compressing the one-dimensional audio signal 22 shown in FIGS. 3 and 4. The example of FIG. 5 comprises a bandwidth compression system 28 which includes an analog to digital converter 30 for converting each of the analog signal values "X" of the audio signal 22 into a corresponding digital value for purposes of storage in a random access memory 32. The random access memory 32 stores a line of digital representations of the analog values "X" as shown in FIGS. 3 and 4. An address generator 34 addresses the successive groups of six analog values "X" within the random access memory 32 in accordance with the sampling region 24 and the subsampling region 26 as previously described in connection with FIGS. 3 and 4. The six samples of each sampling region 24 as so identified by the address generator 34 are converted from their digital form to a corresponding analog form by a digital to analog converter 36 before being temporarily stored in an analog sample and hold memory 38.

The example of FIG. 5 utilizes the random access memory 32 in conjunction with the analog to digital converter 30 and the digital to analog converter 36. However, it will be understood that the use of alternative arrangements is possible, including an analog approach utilizing a bank of analog sample and hold circuits.

The bandwidth compression system 28 of FIG. 5 implements the subsampling algorithm using a one-dimensional neural network 40. The neural network 40 responds to each group of six samples stored in the memory 38 by generating a corresponding signal representing the two samples in the subsampling region 26 and the trend or pattern denoted by the other four samples within the sampling region 24. The result is a bandwidth compressed audio output signal at the output of the neural network 40.

Figure 6:
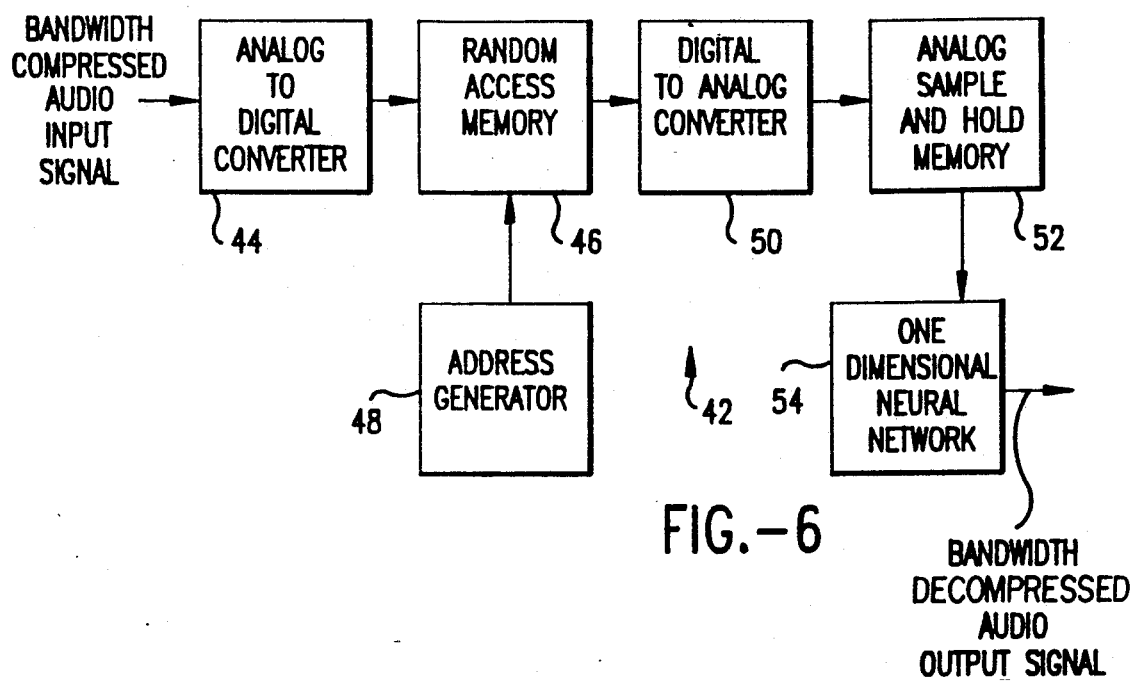
FIG. 6 is a detailed block diagram of a system according to the invention for decompressing a compressed one-dimensional signal such as the audio signal compressed by the system of FIG. 5.

FIG. 6 provides an example of the bandwidth expansion system 16 of FIG. 2 for expanding or decompressing the output signals from the bandwidth compression system 28 of FIG. 5. A bandwidth decompression system 42 comprising the example of FIG. 6 includes an analog to digital converter 44 for converting the bandwidth compressed audio input signal into corresponding digital values for purposes of storage in a random access memory 46. An address generator 48 identifies successive samples in the random access memory 46, and a digital to analog converter 50 converts the samples into corresponding analog values which are temporarily stored in an analog sample and hold memory 52 in groups of three. Each group of three samples temporarily stored in the memory 52 is examined by a one-dimensional neural network 54 which implements the subsampling algorithm by expanding the group of three samples into the six samples comprising each sampling region 24. In essence, the bandwidth decompression system 42 of FIG. 6 functions in the reverse manner from the bandwidth compression system 28 of FIG. 5.

As in the case of FIG. 5 the memory 46 and the converters 44 and 50 can be replaced by an analog arrangement such as one comprised of six analog sample and hold circuits.

In the examples of FIGS. 3–6, the one-dimensional audio signal 22 has two samples in the subsampling region 26 and six samples in the sampling region 24. However, other sampling and subsampling configurations can be used to process a one-dimensional signal in accordance with the invention. Generally speaking there are "n" inputs of data or samples within a subsampling region and an additional "r" inputs or samples within a sampling region encompassing the subsampling region. In the examples of FIGS. 3–6, $n=2$ and $r=4$. The sampling region is comprised of $n+r$ samples, which in the examples of FIGS. 3–6 is $2+4$ or a total of six samples within the sampling region 24. The bandwidth compression ratio is represented by "n", which in the examples of FIGS. 3–6 is a ratio of 2.

Figure 7:
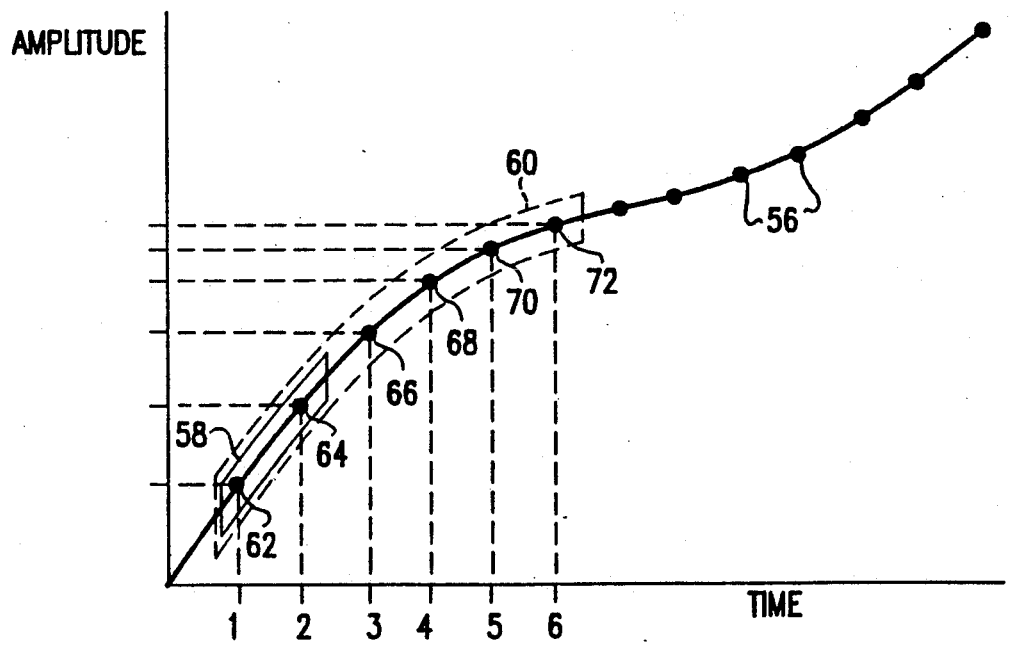
FIG. 7 is a diagrammatic plot of the amplitude of a one-dimensional analog signal as a function of time and illustrating a subsampling technique thereof according to the invention.

FIG. 7 shows a portion of a one-dimensional signal which could be the audio signal 22. The portion of the one-dimensional signal shown in FIG. 7 is a plot of the amplitude of the signal as a function of time. The signal amplitude defines a curve which emanates from the origin of the plot so as to have zero amplitude at time 0. As the time begins to pass, the amplitude of the signal increases before beginning to level off and then undergoing further increase. The horizontal time axis is divided into equal time increments at which the amplitude of the signal is sampled. Six such time increments are shown in FIG. 7, and the corresponding sampling points on the curve of the signal are represented by dots 56. Using the sampling region 24 which comprises six samples and the subsampling region 26 which comprises the first two samples at the left of the sampling region 24, then the subsampling region 26 can be represented by a solid outline 58 in FIG. 7 and the sampling region 24 can be represented by a dashed outline 60 in FIG. 7. The first two of the dots 56 which lie within the solid outline 58 of the subsampling region are labeled 62 and 64 in FIG. 7. The remaining four dots comprising the rest of the sampling region and which lie outside of the solid outline 58 but within the dashed outline 60 are labeled 66, 68, 70 and 72 in FIG. 7.

The manner in which the subsampling technique according to the invention represents the amplitude of the signal of FIG. 7 at the dots 62 and 64 within the solid outline 58 of the subsampling region while at the same time indicating the trend or pattern denoted by the signal amplitudes at the dots 66, 68, 70 and 72 within the dashed outline 60 of the overall sampling region will be better understood by the following discussion.

Subsampling techniques according to the invention can be employed to process two-dimensional signals and three-dimensional signals as well as one-dimensional signals. A typical two-dimensional signal can comprise a video signal.

Figure 8A:
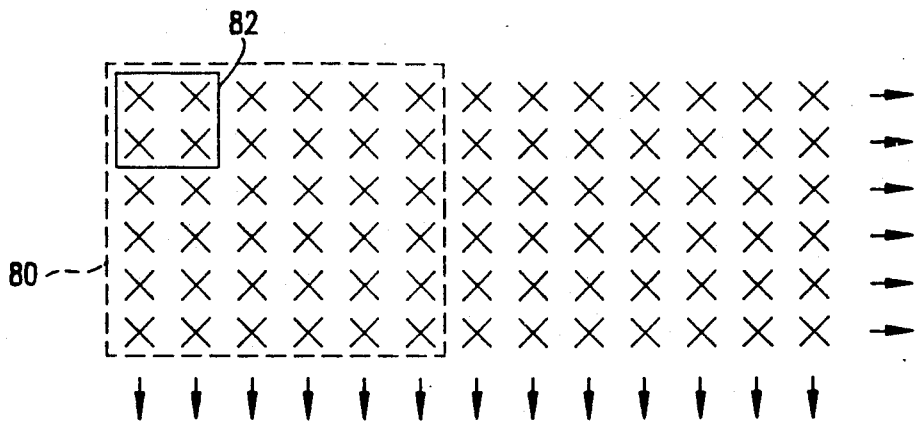
FIG. 8A is a pictorial representation of the pixels of a two-dimensional signal such as an image and illustrating sampling and subsampling regions therein.

FIG. 8A depicts portions of the first six of the lines comprising the raster of a video image. Each "X" shown therein represents an analog signal value or pixel. The subsampling technique employed in conjunction with the video signal of FIG. 8A utilizes a sampling region 80 which is shown in dashed outline and which includes therein a subsampling region 82 shown in solid outline. The sampling region 80 measures six pixels in each of two mutually orthogonal directions so as to be comprised of thirty six pixels. The subsampling region 82 is normally located at the upper left hand corner of the sampling region 80 and is comprised of four pixels.

Figure 8B:
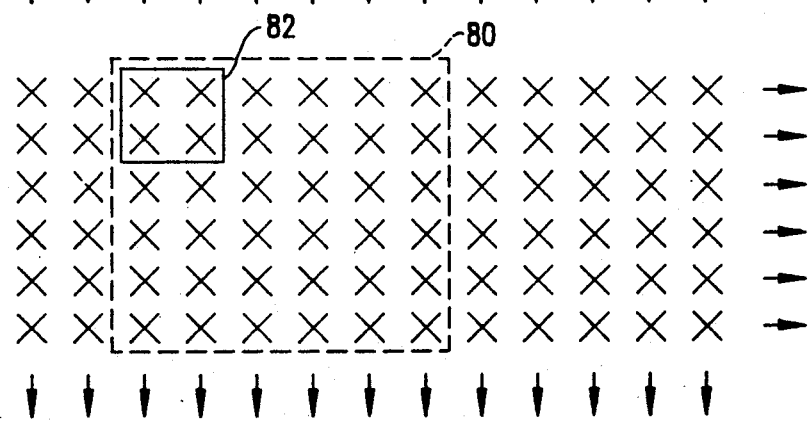
FIG. 8B is a pictorial representation similar to that of FIG. 8A and illustrating the manner in which the sampling and subsampling regions are advanced across the lines of pixels during the subsampling process.
Figure 8C:
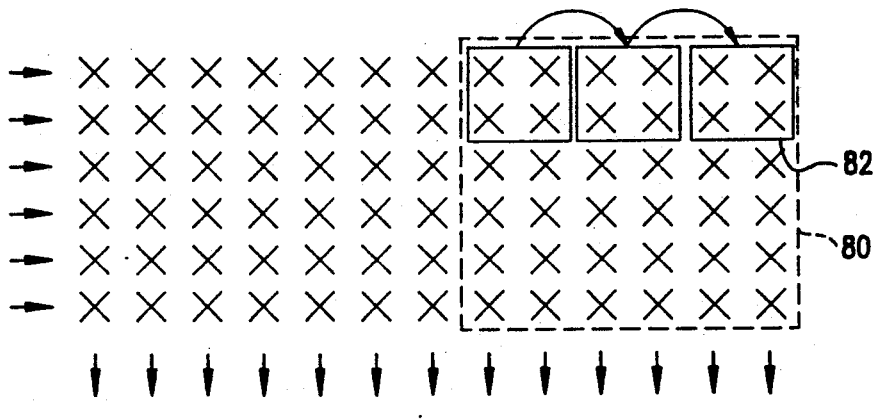
FIG. 8C is a pictorial representation similar to those of FIGS. 8A and 8B and illustrating the manner in which the subsampling region is repositioned within the sampling region as the ends of the lines of pixels are reached during the subsampling process.
Figure 8D:
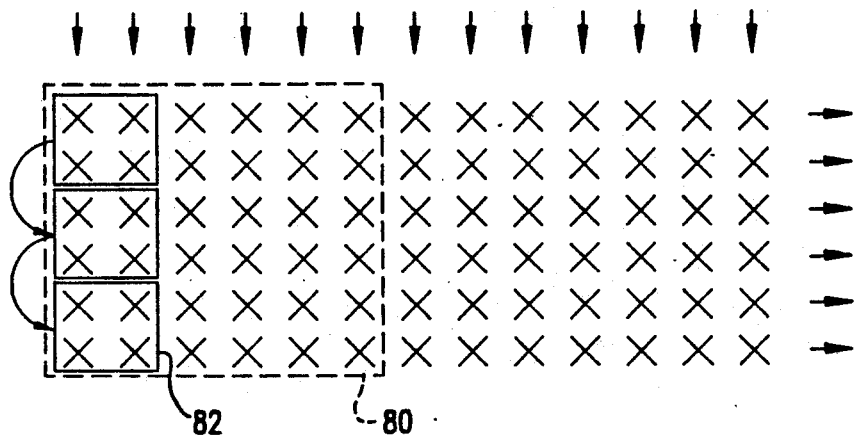
FIG. 8D is a pictorial representation similar to those of FIGS. 8A, 8B, and 8C and illustrating the manner in which the subsampling region is repositioned within the sampling region when the lines at the bottom of the image raster are reached during the subsampling process.

The sampling region 80 is moved to the right in increments of two pixels. Thus, at the location of the sampling region 80 shown in FIG. 8A, a corresponding signal is generated which represents the values of the four pixels within the subsampling region 82 and the trends or patterns denoted by the remaining 32 pixels within the sampling region 82. The sampling region 80 is then stepped to the position shown in FIG. 8B, where again a signal is generated representing the values of the four pixels within the subsampling region 82 and the trend or pattern denoted by the remaining 32 pixels within the sampling region 80. The sampling region 80 continues to be stepped along the six lines until the right hand ends of the lines are reached as shown in FIG. 8C. When the right hand ends of the lines are reached, the sampling region 80 remains in the position shown in FIG. 8C while the subsampling region 82 is stepped to the right so as to encompass the four pixels at the top center of the sampling region 80 and then the four pixels at the top right of the sampling region 80. The sampling process is then repeated with the sampling region 80 beginning at the left hand ends of six new lines and then progressing to the right in the manner just described. The subsampling region 82 remains at the upper left hand corner of the sampling region 80 until the right hand ends of the lines are reached. At that point the subsampling region 82 is stepped to the right in the manner just described.

When the last six lines of the raster are encountered, the sampling region 80 moves from left to right in the manner just described. However, the sampling region 80 is then returned to the left hand ends of the lines and the subsampling region 82 is lowered so as to encompass the four pixels at the center left of the sampling region 80 as shown in 8D. With the subsampling region 82 so positioned within the sampling region 80, the sampling region 80 is then stepped to the right along the lines. At the right hand ends of the lines, the subsampling region 82 is stepped to the right within the sampling region 80 in two increments. The sampling region 80 is then returned to the left hand ends of the lines, whereupon the subsampling region 82 is lowered to encompass the four pixels at the lower left hand corner of the sampling region 80. The sampling region 80 is then stepped to the right. When the right hand ends of the lines are reached, the subsampling region 82 is then stepped to the right within the sampling region 80 in two different steps.

Figure 9:
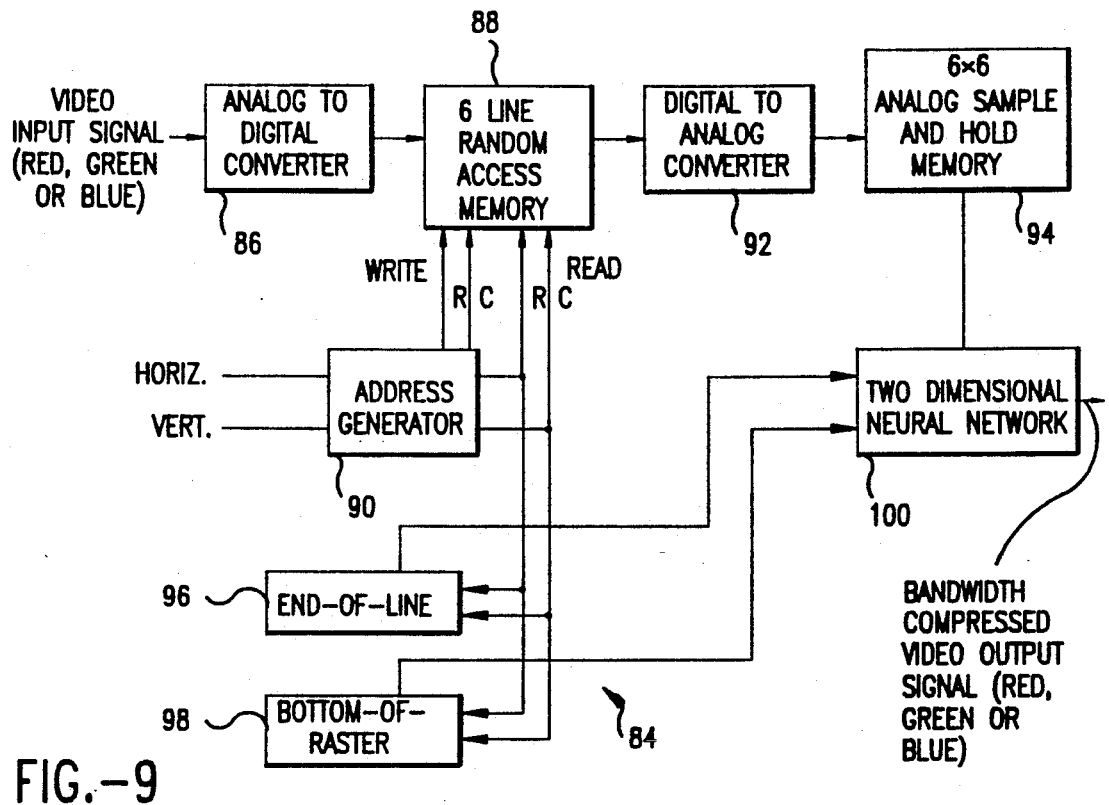
FIG. 9 is a detailed block diagram of a system for compressing the bandwidth of a two-dimensional signal such as a video signal utilizing the sampling and subsampling regions illustrated in FIG. 8A-8D.

FIG. 9 provides an example of the bandwidth compression system 10 of FIG. 1 where used with a video signal and using the subsampling procedure described in connection with FIGS. 8A–8D. A bandwidth compression system 84 which the arrangement of FIG. 9 comprises includes an analog to digital converter 86 for converting the pixels of the video input signal to corresponding digital values which are stored in a six line random access memory 88. The memory 88 stores the six lines in the two-dimensional array shown in FIGS. 8A–8D. Horizontal and vertical synchronizing signals associated with the video input signal are used to operate an address generator 90 which addresses the six line random access memory 88 in a manner so as to define the sampling and subsampling regions 80 and 82 shown in FIG. 8A–8D. Each group of 36 pixels within a sampling region 80 as identified within the memory 88 by the address generator 90 are converted to corresponding analog values by a digital to analog converter 92 prior to being temporarily stored in an analog sample and hold memory 94. The sample and hold memory 94 temporarily stores the $6 \times 6$ array of analog pixel values comprising each sampling region 80. An end-of-line circuit 96 is operative to cause the subsampling region 82 to be stepped to the right within the sampling region 80 as described in connection with FIG. 8C. A bottom-of-raster circuit 98 is operative to cause the subsampling region 82 to be stepped downwardly within the sampling region 80 in the manner described in connection with FIG. 8D.

A two-dimensional neural network 100 is employed to implement the subsampling algorithm in the example of FIG. 9. The network 100 responds to each 6×6 array of analog values comprising each stored in the sample and hold memory 94 by generating a single output signal representing the values of the four pixels within the subsampling region 82 and also denoting the trend or pattern represented by the other 32 pixels within the sampling region 80.

Color video signals are typically presented as three different fields representing the red, green and blue portions of the composite video signal. The bandwidth compression system 84 of FIG. 9 processes each of these three color components separately. However, as described hereafter in connection with FIG. 13, the red, green and blue portions of the video can be presented together in a three-dimensional array and subsampled in a manner which produces a single output signal corresponding to all three color components within a sampling region of the three-dimensional array.

Figure 10:
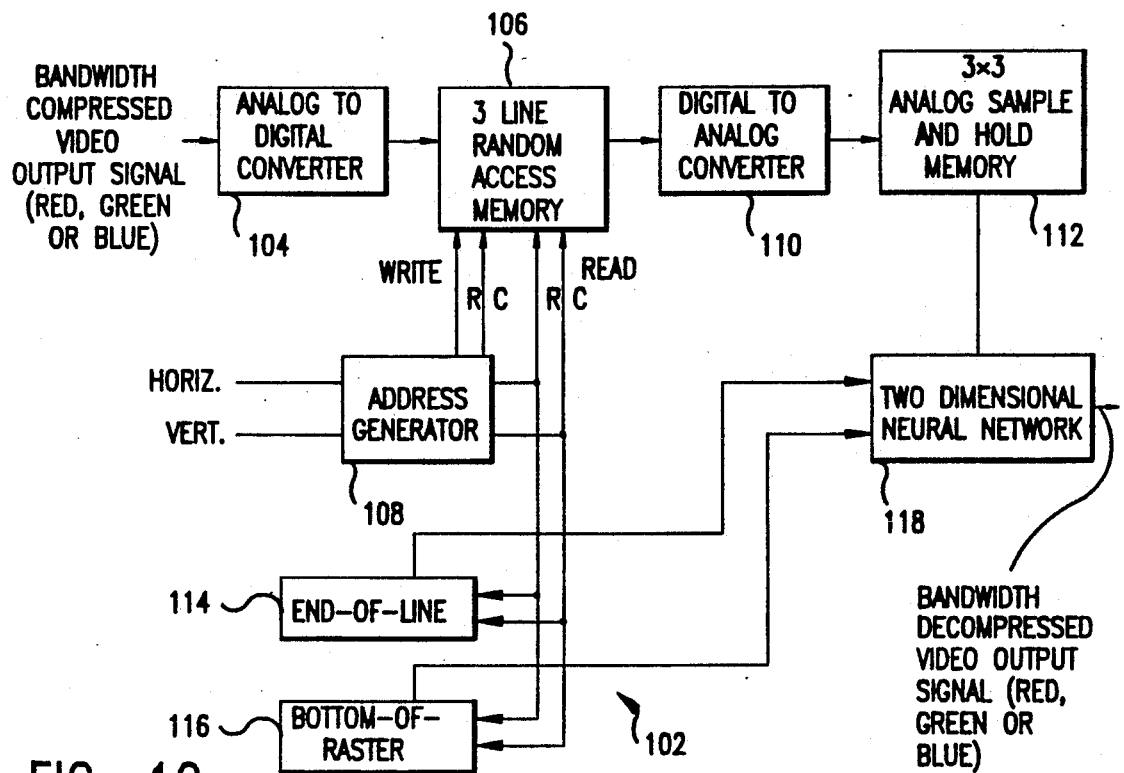
FIG. 10 is a detailed block diagram of a system for decompressing the bandwidth of a two-dimensional signal such as a video signal compressed by the system of FIG. 9.

FIG. 10 provides an example of the bandwidth decompression network 20 of FIG. 2 as used to decompress or otherwise expand a video signal such as the video signal provided by the bandwidth compression system 84 of FIG. 9. A bandwidth decompression system 102 which the arrangement of FIG. 10 comprises includes an analog to digital converter 104 for converting the bandwidth compressed video input signal into corresponding digital values for storage in a three line random access memory 106. The three line random access memory 106 is addressed by an address generator 108 which identifies different groups of 3×3 signals stored therein for conversion by a digital to analog convertor 110 followed by temporary storage within an analog sample and hold memory 112. The address generator 108 functions in response to the horizontal and vertical synchronizing signals of the video signal, and is assisted by an end-of-line circuit 114 for subsampling at the right hand ends of the lines of the raster and a bottom-of-raster circuit 116 for subsampling at the bottom of the raster lines. A two-dimensional neural network 118 responds to each 3×3 array of values corresponding to the sampling region 80 and temporarily stored in the sample and hold memory 112 to expand the information represented thereby in accordance with the subsampling algorithm.

Figure 11:
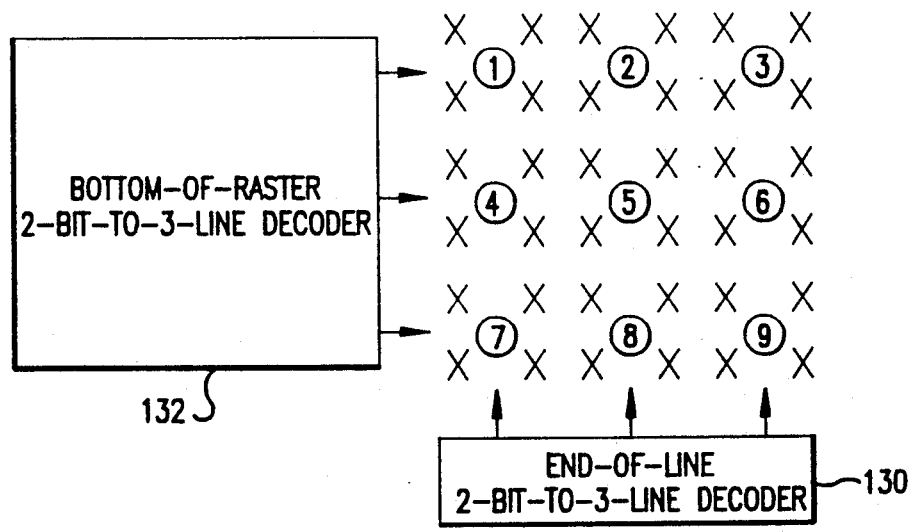
FIG. 11 is a pictorial representation of image pixels within the sampling region of FIGS. 8A-8D and illustrating processing which takes place when the ends of the raster lines and the bottom of the raster are reached.

The manner in which the analog values are stored in the sample and hold memory 112 and are addressed by the two-dimensional neural network 118 is pictorially illustrated in FIG. 11. The 3×3 sample and hold memory 112 stores nine analog values which are used in reconstructing the 6×6 sampling region 80. Each of the nine analog values is represented by an encircled number in FIG. 11. Each encircled number is surrounded by four pixels corresponding to the pixels within the subsampling region 82 used to generate such analog value.

The end-of-line circuit 114 in FIG. 10 provides a two-bit signal to the two-dimensional neural network 118. This two-bit signal indicates when the subsampling region 82 remains at the left of the sampling region 80 and when such subsampling region 82 is to be stepped to the center or the right of the sampling region. A two-bit to three-line decoder 130 shown in FIG. 11 responds to the two-bit signal from the end-of-line circuit 96 by indicating which of the three different column locations within the sampling region 80 the subsampling region 82 is located in.

The bottom-of-raster circuit 116 in FIG. 10 provides a two-bit signal indicating whether the subsampling region 82 is at the top, the center or the bottom of the sampling region 80. This two-bit signal is applied to a two-bit to three-line decoder 132 shown in FIG. 11 to determine in which of the three different row positions within the sampling region 80 the subsampling region 82 lies.

Figure 12:
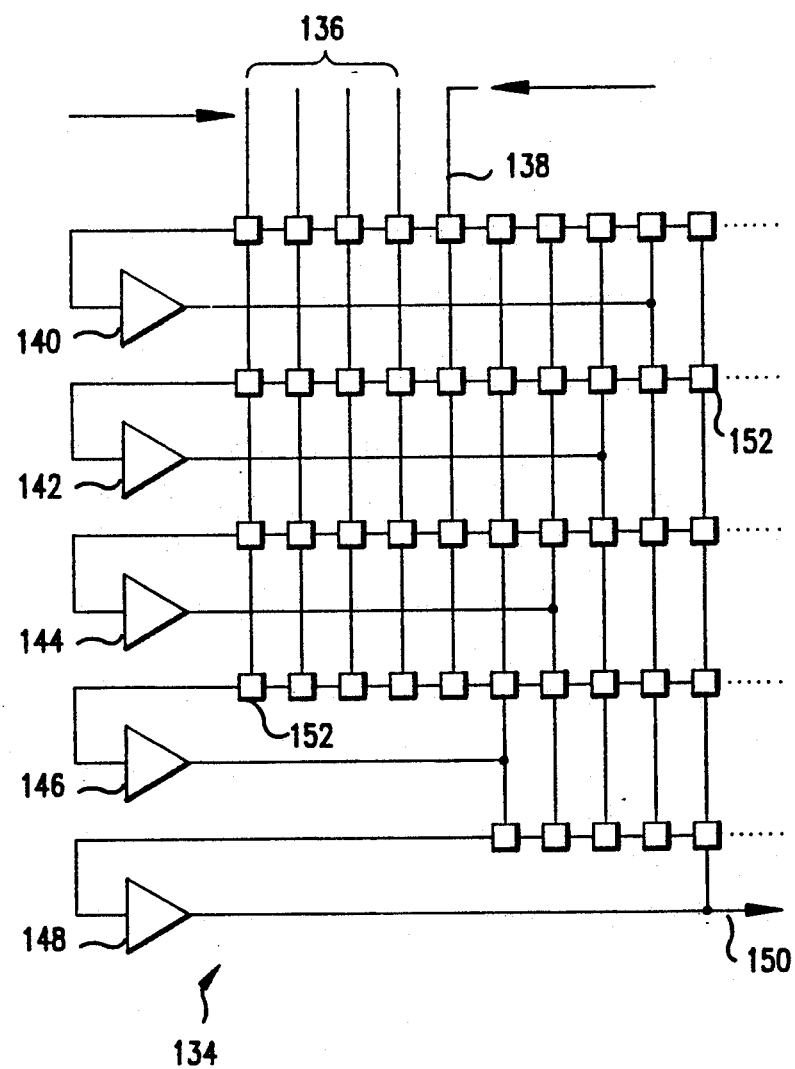
FIG. 12 is a schematic diagram of a neural network of the type which may be used in the systems of FIGS. 9 and 10.

FIG. 12 is a schematic diagram of a modified neural network 134. The neural network 134 is one of nine neural networks comprising the two-dimensional neural network 100 of FIG. 9. Each of the nine neural networks corresponds to a different one of the nine analog values shown in FIG. 11 and the four pixels of the subsampling region 82 associated therewith. The analog values of the four pixels associated with the neural network 134 of FIG. 12 are applied via four leads 136 at the top thereof. The output signal from another one of the neural networks is applied to a lead 138 at the top of the neural network 134.

As shown in FIG. 12, the modified neural network 134 is comprised of operational amplifiers and resistors. Four of the operational amplifiers 140, 142, 144 and 146 correspond to the analog values of the four pixels of the corresponding subsampling region 82 which are fed into the neural network 134 via the leads 136. A fifth operational amplifier 148 provides the output signal of the neural network 134 via a lead 150 shown at the bottom thereof. The various resistors of the neural network 134 are represented by squares 152. Each resistor represents a coefficient of a particular term of the overall neural network equation. Some of the resistors have a diode (not shown) associated with them for non-linear coefficients.

While the example of FIG. 12 utilizes operational amplifiers, other arrangements are possible for implementing the modified neural network 134. As described hereafter in connection with FIGS. 20–25, for example, arrangements of multipliers, dividers and comparators can be used. The implementation of large-scale neural networks that deal with input samples in excess of two can utilize multipliers, dividers and comparators.

The subsampling of a two-dimensional signal can use a square subsampling region, as in the case of FIGS. 8–12, in which event the subsampling region can be said to measure n pixels by n pixels for a total of $n^2$ pixels within the subsampling region. $n^2$ also represents the bandwidth compression ratio. In the case of FIGS. 8–12, n=2 and the compression ratio is $2^2$ or 4. The sampling region can be said to comprise n+r pixels in each direction for a total of $(n+r)^2$ pixels. In the example of FIGS. 8–12, the sampling region 80 comprises $(2+4)^2$ or 36 pixels.

The subsampling of a two-dimensional signal can also use a rectangular subsampling region measuring k pixels by l pixels, in which event the compression ratio is represented by kl. If the sampling region measures k+r pixels in one direction and l+r pixels in a mutually orthogonal direction, then the sampling region comprises a total of (k+r)(l+r) pixels.

Figure 13:
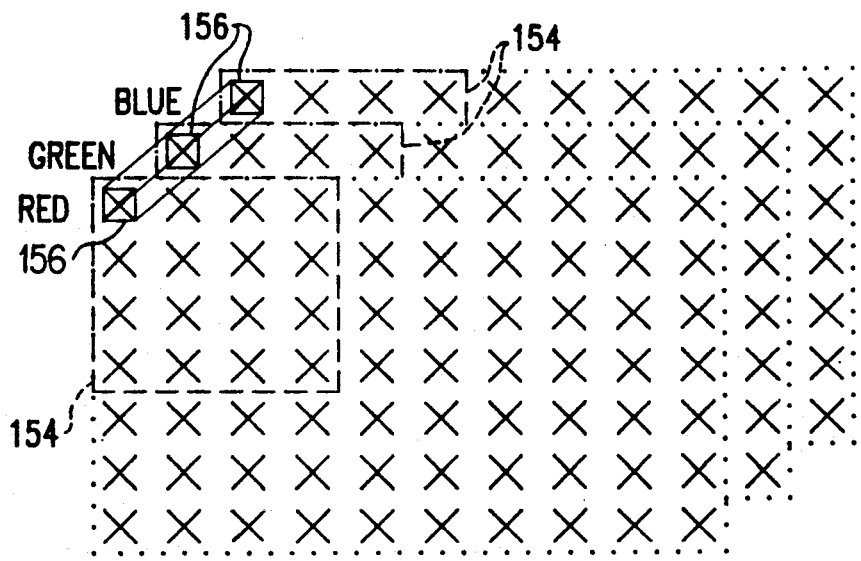
FIG. 13 is a pictorial representation of the red, green and blue fields of a color image arranged into a three-dimensional array and illustrating an example of the manner in which a three-dimensional signal array is subsampled according to the invention.

The video signals of FIGS. 8–12 have been described in terms of a two-dimensional signal corresponding to the raster of the successive signal frames. Where the video or other analog signal is a color signal, however, such signal is represented by three different two-dimensional arrays or rasters corresponding to the red, green and blue fields of the signal. The resulting three-dimensional arrangement is shown in FIG. 13. In the example of FIG. 13 the red, green and blue arrays are sampled simultaneously using a subsampling techniques having a 4×4 sampling region 154 within each two-dimensional array. Each sampling region 154 includes a single pixel subsampling region 156 which is normally located at the upper left hand corner of the sampling region 154 except when the right hand ends of the lines and the bottom of the raster are encountered. In that event, the subsampling regions 156 are stepped to the right or down in the manner previously described.

In accordance with the invention pixel values from the three different sampling regions 154 and the subsampling regions 156 therein are processed simultaneously so as to generate a single output signal. The output signal represents the values of the single pixels within the three subsampling regions 156. The output signal also has a value denoting trends or patterns as representing by the remaining fifteen pixels within each of the three sampling regions 154. Accordingly, each output signal contains information pertaining to the 3×16 or 48 pixels contained within the three sampling regions 154.

In the example of FIG. 13 each of the subsampling regions 156 is comprised of a single pixel, and therefore n=3. Each sampling region 154 is a square measuring n+r pixels in each direction, where r=3. Accordingly, each compressed signal output is based on $3(n+r)^2$ pixels.

In the example of FIG. 13, the sampling regions 154 are square and measure n +r pixels on each side as noted above. However, the sampling regions can be rectangular in shape so as to measure kx by ly pixels, where k is the number of pixels in the x direction and l is the number of pixels in the y direction mutually orthogonal with the x direction. In that event, the number of pixels per sample is k×l×m, where m is the dimension in the z direction mutually orthogonal to the x and y directions.

The successful use of the subsampling techniques in accordance with the invention to process audio and visual signals is based on the observation that human aural and visual perception cannot detect errors which are less than a certain magnitude. More specifically, it has been observed that human aural and visual perception cannot detect errors of less than 10% for one sample, as long as the sample is no more than the period of the highest frequency of the aural or visual signal. The next highest frequency must be within a 3% error band. The third shortest period must be within a 1% error band, and so forth.

The subsampling technique according to the invention uses a combination of non-linear interpolation and extrapolation so that the output signals are relatively close approximations of the original input signals. It has been observed that input signals representing a straight line result in virtually no error. Input data of non-linear curves such as sinusoids, parabolas and exponential curves results in errors of less than 1% of full scale. Zigzag patterns, square wave patterns, and other patterns having horizontal frequencies higher than the subsampling rate result in errors less than 1% of full scale in the case of a two-dimensional network if the vertical period of the pattern is longer than six horizontal lines. If the period is shorter than six horizontal lines, there could be an error greater than 1%.

In the case of audio signals, a sampling rate of 67.5 kilohertz, which is more than twice as high as the highest audio frequency to avoid aliasing, results in no significant error. In the case of video signals, a sampling rate of 74.25 megahertz may be used. This provides a pixel period of 13.47 nanoseconds. This is 9438/2 times the horizontal scanning frequency of a standard video signal (NTSC).

It was previously noted in connection with the neural network 134 of FIG. 12 that the resistors 152 of the network provide the coefficients for the neural network equation. In the case of video signals, coefficients can be ignored if they represent less than about 2% of the total output value. The human eye does not perceive a 2% difference in luminosity and color over a short span or edge. Also, as noted above, a sampling rate of 74.25 megahertz provides a pixel period of 13.47 nanoseconds. For the example of FIGS. 8-12 in which the subsampling region 82 is comprised of four pixels, the response time of the neural network must be less than four times 13.47 nanoseconds or 53.87 nanoseconds. In the case of the neural network 134 of FIG. 12, the settling time of the operational amplifiers 140, 142, 144, 146 and 148 can be selected so that the network response time is on the order of 30 nanoseconds.

Figure 14:
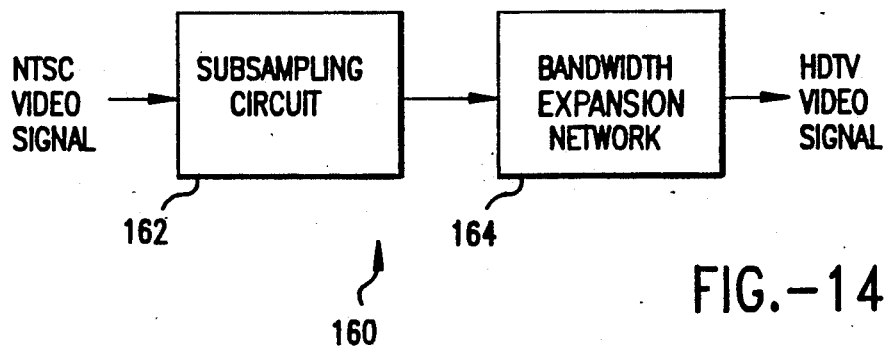
FIG. 14 is a basic block diagram of a synthesizer system according to the invention for expanding a standard video signal into a high definition video signal.

FIG. 14 shows a bandwidth expansion circuit in the form of a synthesizer 160. The synthesizer 160 is like the bandwidth expansion system 16 of FIG. 2, except that it is designed to expand a standard (NTSC) video signal into a high definition (HDTV) video signal. The synthesizer 160 includes a subsampling circuit 162 similar to the subsampling circuit 18 of FIG. 2 and a bandwidth expansion network 164 similar to the bandwidth decompression network 20 of FIG. 2.

The subsampling circuit 162 implements a subsampling algorithm in accordance with the invention to expand the NTSC video signal into an HDTV video signal with the assistance of the bandwidth expansion network 164. The subsampling circuit 162 accomplishes this by identifying periodic pixel values of the NTSC video signal and then expanding each of those values into a sampling region of pixels using the bandwidth expansion network 164. As described hereafter the portion of the frames of the NTSC video signal sampled and the expansion ratio are selected to accommodate the differences between the NTSC and HDTV frames and also the differences in their aspect ratios.

Figure 15A:
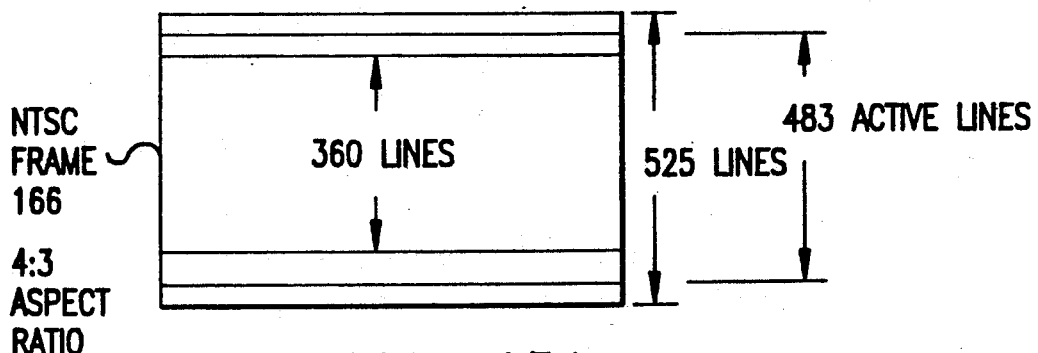
FIG. 15A is a pictorial representation of a frame of a standard video signal illustrating the total lines and the active lines of the frame raster and the portion of the active lines which is addressed when utilizing the synthesizer system of FIG. 14.
Figure 15B:
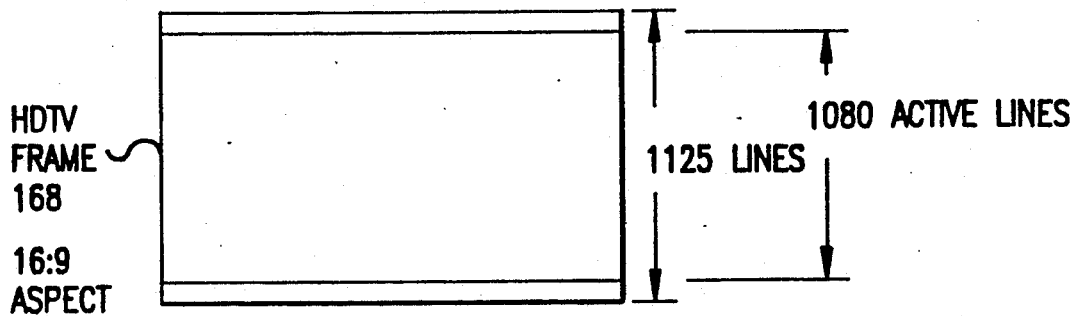
FIG. 15B is a pictorial representation of a frame of a high definition video signal produced by the synthesizer system of FIG. 14 and illustrating the total lines and the active lines of the raster thereof.

FIG. 15A shows an NTSC frame 166 which has an aspect ratio of 4:3. The NTSC frame 166 has a total of 525 lines from top to bottom, with 483 of those lines being active lines. FIG. 15B shows a typical HDTV frame 168 which is comprised of 1125 lines from top to bottom. 1080 of those lines are active lines. The HDTV frame 168 is more elongated in shape than is the NTSC frame 166, and has an aspect ratio of 16:9.

The synthesizer 160 of FIG. 14 is operative to expand a selected portion of each NTSC frame 166 so as to have 1080 active lines and so as to fit within the HDTV frame 168. This is accomplished by sampling 362 of the 483 active lines within the NTSC frame 166 and expanding those lines by a ratio of 3:1 so as to comprise the 1080 active lines of the HDTV frame 168. The reason 362 lines are stored and sampled is that such number is approximately three-quarters of the 483 active lines. Of the 362 lines, the first 360 lines are observed and compressed. The last two lines are in the sampling regions that are not sampled. A 3:1 expansion in the horizontal direction is carried out at the same time.

The NTSC frame 166 has 1920 pixels in each line thereof. Such pixels are sampled at a rate to yield one-third of that or 640 samples per line. The 640 samples are then expanded by a factor of 3:1 in the horizontal direction to produce the 1920 pixels per line at the same time that 360 lines within the center of the NTSC frame 166 are expanded by a factor of 3:1 to produce the 1080 active lines of the HDTV frame 168.

Figure 16:
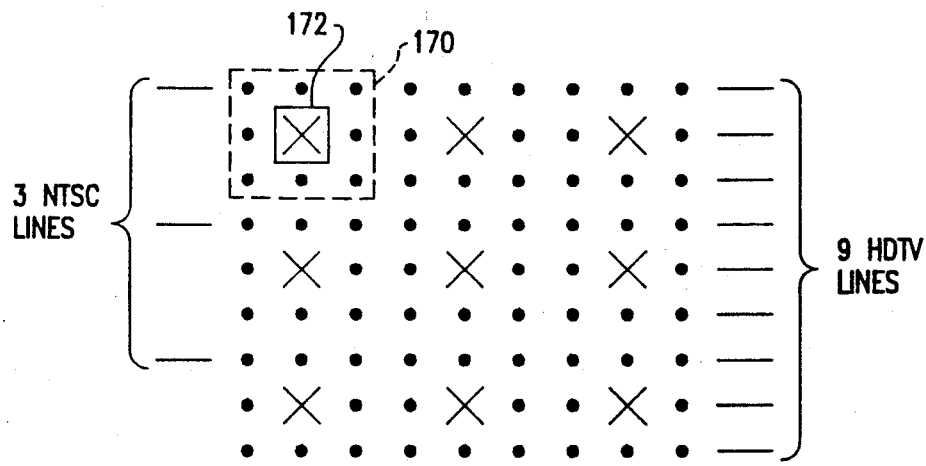
FIG. 16 is a pictorial representation of the samples of a standard video signal illustrating the manner in which such samples are expanded into a high definition video signal utilizing the synthesizer system of FIG. 14.

The 3:1 expansion necessary to accomplish conversion of the NTSC video signal into the HDTV video signal is shown in FIG. 16. As shown in FIG. 16, a sampling region 170 which is square in shape and comprised of 3×3 samples is utilized. The sampling region 170 has a subsampling region 172 therein which is normally located at the upper left hand corner of the sampling region 170 and which is comprised of a single sample. As previously noted the third pixel within each of the 360 lines of the NTSC frame 166 of FIG. 15A is sampled during the scanning process. The sample corresponds to the single sample "X" within the subsampling region 172. The bandwidth expansion network 164 of the synthesizer 160 of FIG. 14 responds by expanding "X" into the nine samples or values (shown as dots in FIG. 16) of the sampling region 170. The process is repeated with each third pixel in each of the 360 lines of the NTSC frame 166. This produces the 3:1 expansion in the horizontal direction necessary to expand the 640 samples per line into the 1920 pixels per line within the HDTV frame 168. It also provides the 3:1 expansion in the vertical direction necessary to expand the 360 lines of the NTSC frame 166 into the 1080 active lines of the HDTV frame 168. In the process, the 4:3 aspect ratio of the NTSC frame 166 is changed to the 16:9 ratio of the HDTV frame 168. By using three-fourths of a 4:3 aspects ratio, the mathematical result is 4/3/3/4 or 16/9.

Although the examples of sampling regions described herein normally locate the subsampling region in the upper lefthand corner of the sampling region, it should be understood that the subsampling region can be nominally located elsewhere in the sampling region such as at the center or the lower right hand corner thereof.

Figure 17:
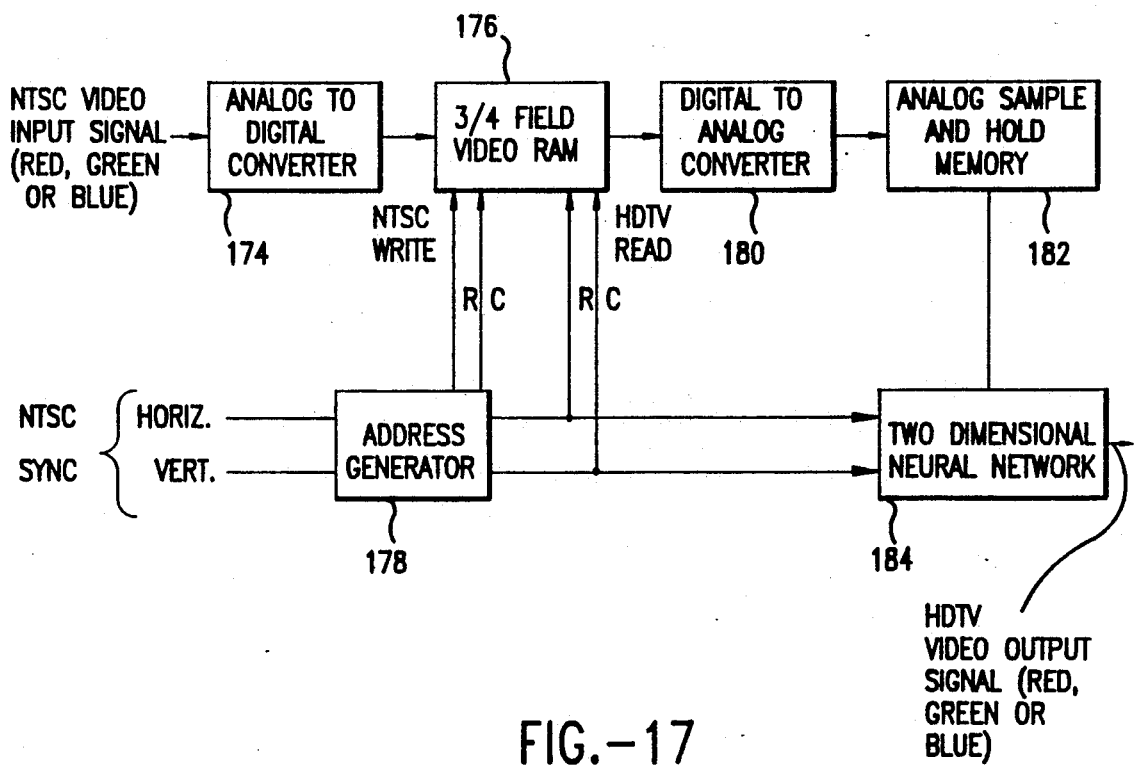
FIG. 17 is a detailed block diagram of the synthesizer system of FIG. 14.

FIG. 17 is a detailed block diagram of the synthesizer 160 of FIG. 14. As shown in FIG. 17 the pixels of each frame of the NTSC video input signal are converted to digital values by an analog to digital converter 174 and are stored in a ¾ field video RAM 176. The RAM 176 is a ¾ field RAM inasmuch as only ¾ths of the 483 active lines or 362 lines of the NTSC frame 166 are processed therein. An address generator 178 responds to the horizontal and vertical synchronizing signals of the NTSC video input signal to provide the succession of the sampling regions 170 within the RAM 176. As each sampling region 170 is located within the RAM 176, the single pixel within the subsampling region 172 thereof is converted into its corresponding analog value by a digital to analog converter 180 and is temporarily stored in an analog sample and hold memory 182. A two-dimensional neural network 184 responds to the analog samples temporarily stored in the analog sample and hold memory 182 by expanding each such sample into a matrix of 3×3 pixels as shown in FIG. 16.

A synthesizer such as the synthesizer 160 of FIG. 14 can be used to expand other types of signals such as a one-dimensional audio signal as described in connection with FIGS. 18 and 19.

Figure 18:
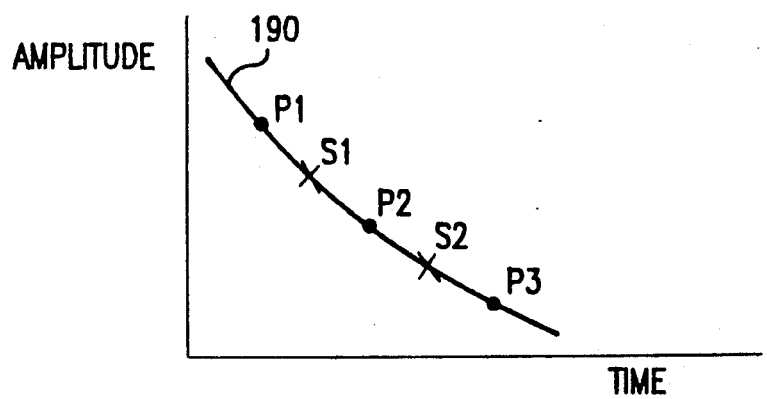
FIG. 18 is a diagrammatic plot of signal amplitude as a function of time and illustrating an example of signal expansion which can be used in the system of FIG. 17.

FIG. 18 shows a curve 190 comprising a portion of a one-dimensional audio signal. S1 and S2 represent two of a succession of sampling points on the curve 190 of the one-dimensional audio signal. In the present example a 5:2 expansion is provided such that the two sampling points S1 and S2 are expanded into five analog values. The additional values which occur between the sampling values are shown as P1, P2 and P3 in FIG. 18. A neural network 192 for accomplishing the 5:2 expansion is shown in FIG. 19.

Figure 19:
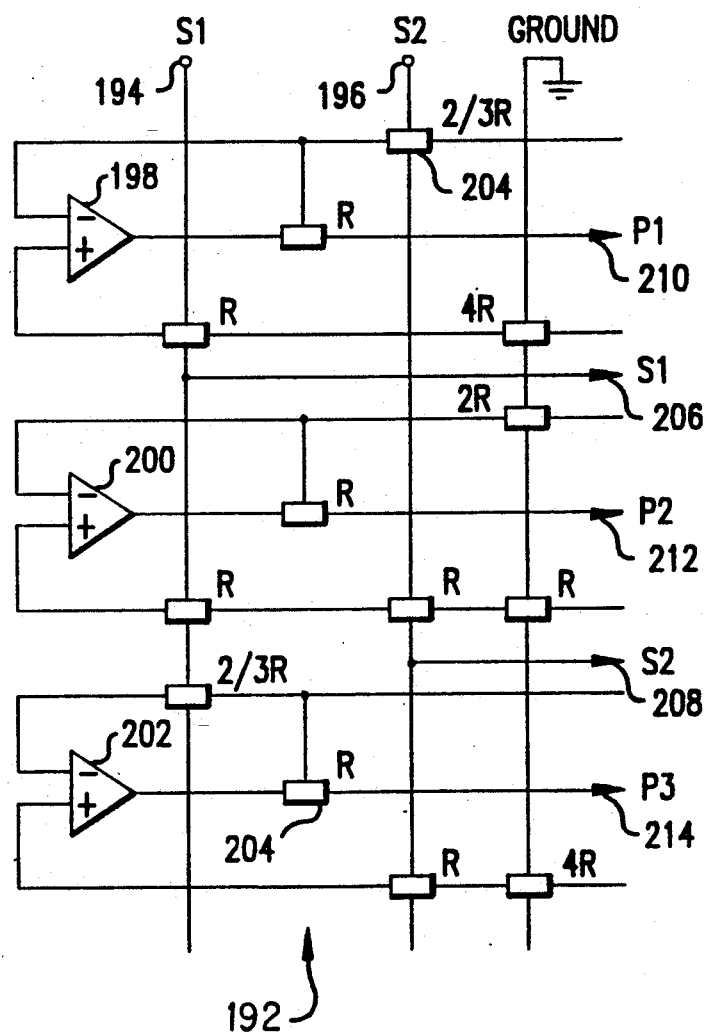
FIG. 19 is a schematic diagram of a neural network for providing the signal expansion illustrated in FIG. 18.

Turning to FIG. 19, each pair of samples such as the samples S1 and S2 are applied to a pair of input terminals 194 and 196. The neural network 192 also includes three different operational amplifiers 198, 200 and 202 as well as a plurality of squares which represent resistors 204. The values of the resistors 204 are shown as multiples of a given resistance R.

The sample values S1 and S2 are provided at output terminals 206 and 208 respectively. At the same time, the operational amplifiers 198, 200 and 202 function in combination with the resistor 204 to provide the analog values P1, P2 and P3 at output terminals 210, 212 and 214 respectively.

As previously described, systems in accordance with the invention accomplish decompression of a compressed signal using a process which is essentially the reverse of the sub-sampling technique used in compressing the signal. As noted in connection with FIG. 2, for example, the bandwidth decompression network 20 functions in cooperation with the sub-sampling circuit 18 to decompress the compressed analog signal at the input thereof using the reverse of the sub-sampling process or algorithm used for compression. The decompression process utilizes interpolation and extrapolation as necessary to produce a decompressed signal which is a close approximation of the original uncompressed signal.

As also previously described, the sub-sampling process used in compression involves retention of a representation of signal values within a sub-sampling region. At the same time, however, the compressed signal is also provided with information denoting trends or patterns as represented by other portions of a larger sampling region which encompasses the sub-sampling region. This combination of information is used in the interpolation and extrapolation performed during decompression of the signal. Interpolation, in its simplest form, refers to the process of using two values of a signal to compute one or more values of the signal lying between those two values. In the case of a reasonably linear analog signal, the two values are simply averaged to determine a signal value intermediate the two values. In the case of highly non-linear analog signals however, the computational process becomes more complex and often requires consideration of signal values outside of the two values in determining a value between the two values. Extrapolation is likewise complex and typically requires consideration of a number of different signal values. Extrapolation is typically used in certain situations such as when the end of a signal is being approached and one or more values outside of the known signal values must be determined. Examples of the interpolation and extrapolation processes are provided hereafter.

Figure 20:
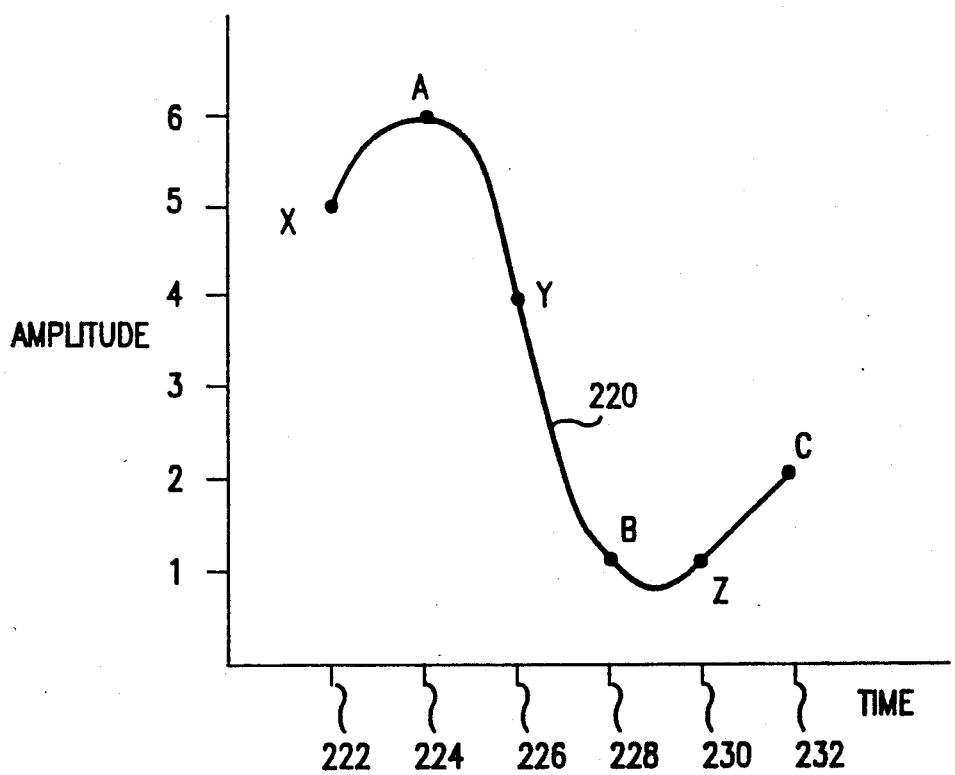
FIG. 20 is a diagrammatic plot of the amplitude of a highly non-linear one-dimensional analog signal as a function of time useful in explaining the manner in which interpolation and extrapolation are used to decompress a compressed version of such signal.

FIG. 20 depicts a portion of an analog signal 220 which is highly non-linear in nature. The portion of the analog signal 220 shown in FIG. 20 is a plot of the amplitude of the signal 220 as a function of time. The time axis is divided into a plurality of generally equal intervals defining sampling points 222, 224, 226, 228, 230 and 232. The sampling point 220 corresponds to a point or value X of the signal 220. In similar fashion, the sampling points 224, 226, 228, 230 and 232 correspond to points or values A, Y, B, Z and C along the signal 220. As will be seen from FIG. 20, the points X, A, Y, B, Z and C have values of 5, 6, 4, 1, 1 and 2, respectively.

It is assumed that the analog signal 220 of FIG. 20 as compressed for transmission or other processing retains only the value points X, Y and Z. To then decompress the analog signal 220, it is necessary to employ interpolation and extrapolation to determine the signal values at points such as A, B and C in order to reconstruct the signal 220. To accomplish this, certain equations must be implemented such as through use of a neural network, as previously described. For example, the value of the signal 220 at the point A may be represented by the equation:

$$A = \frac{X + Y + (Y - Z)}{2}$$

In this instance, it will be seen that the signal value at point A is not only dependent on X and Y but also on the difference between Y and Z. Thus, interpolation in this instance to determine the value at point A between the points X and Y not only utilizes the values at X and Y but also the outside value at Z. The formula used to determine A could also be used to determine other values along the signal 220 using three of the known values, which are X, Y and Z in the case of A. However, as the end of the portion of the signal 220 shown in FIG. 20 is approached, other equations utilizing both interpolation and extrapolation are used to determine the values at points B and C. In the present example, the equations used to determine the values at points B and C are as follows:

$$B = \frac{Z + Y - \frac{A}{(Y + X)}}{3.5}$$

$$C = \frac{2Z + \frac{Y}{2} + B}{2.5}$$

It will be noted that the equation for point B requires the value of A which is determined using the equation previously set forth. Similarly, the equation for C requires that the value of B first be determined.

As previously noted, points X, Y and Z are the known values of the analog signal 220 as presented for decompression. The points X, Y and Z have the values 5, 4 and 1, respectively. Using these values to solve for A:

$$A = \frac{5 + 4 + (4 - 1)}{2} = \frac{12}{2} = 6$$

With the value at point A having thus been determined, this value can then be used together with the values of X, Y and Z to solve for B as follows:

$$B = \frac{1 + 4 - \frac{6}{(4 + 5)}}{3.5} = \frac{1 + 4 - 1.5}{3.5} = 1$$

Similarly, the now known value of B can be used together with the known values of Y and Z to solve for C as follows:

$$C = \frac{2 \cdot 1 + \frac{4}{2} + 1}{2.5} = \frac{2 + 2 + 1}{2.5} = 2$$

Comparing the results of the three equations with the points A, B and C in FIG. 20, it will be seen that the equations determine the values of the signal 220 at such points in accurate fashion. It will also be seen that relatively non-linear analog signals such as the signal 220 require a larger number of signal values to carry out the interpolation and extrapolation processes. In the case of a relatively linear signal, the simple averaging of two values will usually provide an accurate determination of the value of the signal at a point intermediate the two values.

The interpolation and extrapolation process may be accomplished utilizing a neural network, as previously noted. Thus, in the case of the bandwidth decompression system 42 shown in FIG. 6, the one-dimensional neural network 54 is used. Logic circuitry is used in conjunction with the neural network to determine the equations to be used by the neural network. Thus, in the case of the analog signal 220 of FIG. 20, comparators are used to compare the relative values at the points X, Y and Z. Based on such relative values, other logic circuitry such as a look-up table can be used to determine which of the three equations set forth above should be implemented by the neural network.

As noted above, the equation used to determine the value of A uses the known values of X, Y, and Z, and is therefore an interpolation type of equation. The equations used to determine B and C, on the other hand, also require that first other values such as A and B be determined. Such equations are extrapolative in nature.

The selection of equations used to determine values such as A, B and C is a factor in the accuracy of the values so determined. To simplify matters, for example, the same equation used to determine the value of A can also be used to determine other values. If such equation is used to determine the value of B, then the result is B=2. As seen in FIG. 20, the value at point B is actually 1 and not 2. However, in the case of audio or video signals, such inaccuracies may not be catastrophic. In a video system, for example, it is likely that a value of 2 instead of 1 at point B would not be visually noticeable.

Figure 21A:
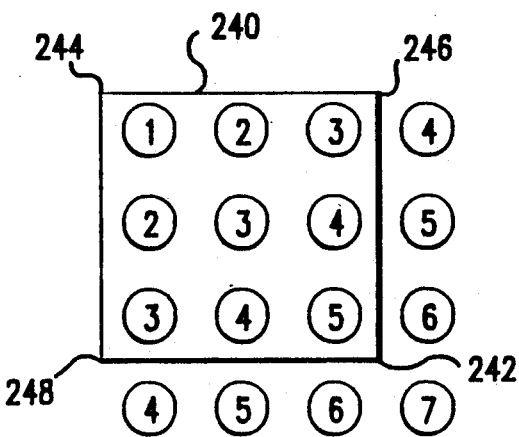
FIG. 21A is a pictorial representation of an oblique plane showing values thereof at selected sample points.

FIGS. 21A-D provide an example of a two-dimensional signal representing an oblique plane 240. FIGS. 21A-D include a plurality of small circles representing values at discrete points located both within and outside of the plane 240. FIG. 21A shows 9 such circles inside of the outer boundary of the plane 240 and 7 additional circles adjacent and outside of the boundary of the plane 240. The plane 240 is assumed to be inclined relative to a horizontal plane so that a corner 242 is at a highest point relative to the horizontal plane with an opposite corner 244 being at the horizontal plane. The remaining two corners 246 and 248 are at heights above the horizontal plane which are half that of the corner 242. The numbers within the various circles shown in FIG. 21A therefore represent the height above the horizontal plane of the plane 240 at such locations.

Figure 21B:
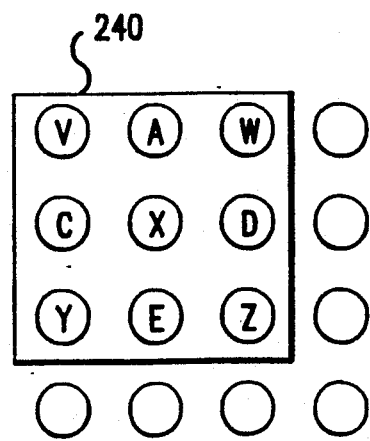
FIG. 21B is a pictorial representation similar to that of FIG. 21A and illustrating the manner in which certain of the sample points are used to provide a compressed signal representing the oblique plane.

FIG. 21B represents a case in which the signal representing the two-dimensional plane 240 of FIG. 21A has been compressed for transmission or other processing.

The various circles shown in FIG. 21B are redesignated in terms of whether they represent values retained in the compressed signal or values to be determined upon decompression of the circles. The circles labelled V, W, X, Y and Z represent 5 values of the plane 240 which remain in the compressed signal. The circles designated A, C, D and E represent values of the plane 240 to be determined as part of the decompression process.

The values of A, C, D and E can be determined using the following equations:

$$A = \frac{\left[\frac{V+W}{2}\right] + \left[2X - \frac{Y+Z}{2}\right]}{2}$$

$$C = \frac{\left[2X - \frac{W+Z}{2}\right] + \left[\frac{V+Y}{2}\right]}{2}$$

$$D = \frac{\left[\frac{W+Z}{2}\right] + \left[2X - \frac{V+Y}{2}\right]}{2}$$

$$E = \frac{\left[\frac{Y+Z}{2}\right] + \left[2X - \frac{V+W}{2}\right]}{2}$$

FIG. 21C shows the actual values of the retained values V, W, X, Y and Z, which correspond to the values shown in FIG. 21A. FIG. 21C also shows the values A, C, D and E to be determined. If the known values of B, W, X, Y and Z are substituted in the above equations, then the equations solve as follows:

$$A = \frac{\left[\frac{1+3}{2}\right] + \left[2 \cdot 3 - \frac{3+5}{2}\right]}{2} = \frac{2+2}{2} = 2$$

$$C = \frac{\left[2 \cdot 3 - \frac{3+5}{2}\right] + \left[\frac{1+3}{2}\right]}{2} = \frac{2+2}{2} = 2$$

$$D = \frac{\left[\frac{3+5}{2}\right] + \left[2 \cdot 3 - \frac{1+3}{2}\right]}{2} = \frac{4+4}{2} = 4$$

$$D = \frac{\left[\frac{3+5}{2}\right] + \left[2 \cdot 3 - \frac{1+3}{2}\right]}{2} = \frac{4+4}{2} = 4$$

FIG. 21D shows the plane 240 with the values of A, C, D and E as determined by the equations. It will be seen that such values correspond to the values shown in FIG. 21A. Determination of the missing values A, C, D and E involve the use of both interpolation and extrapolation, as represented by the equations set forth above. Such equations may be selected and implemented using a neural network in combination with logic circuitry, as previously described.

FIG. 22 and the corresponding waveforms of FIGS. 23A-D provide a still further example of the manner in which a compressed signal is decompressed by interpolation and extrapolation in accordance with the invention. The example of FIGS. 22 and 23A-D involves a linear analog signal which is processed as a function of time as determined by a system clock 260 shown in FIG. 22. The linear analog signal to be compressed, which is shown in FIG. 23A, is applied to a node 262 at the input of a sample and hold circuit 264 having an output thereof coupled to a node 266. The sample and hold circuit 264 periodically samples the signal of FIG. 23A applied to the node 262 at a sampling rate determined by the clock 260. The resulting signal at the node 266 is shown in FIG. 23B. It will be seen in FIG. 23B that the signal thereof changes in step fashion with each step change thereof corresponding to a sampling provided by the clock 260.

The compressed signal of FIG. 23B at the node 266 may be transmitted or otherwise processed before being applied to a node 268 of an expansion circuit 270 shown in FIG. 22. The expansion circuit 270 includes a one-half clock period delay 272 between the node 268 and a summing junction 274. The summing junction 274 which has a second input thereof coupled directly to the node 268, has an output thereof coupled to a node 276. The node 268 is also coupled to a second summing junction 278, both directly and through a one-fourth clock period delay 280. The output of the one-half clock period delay 272 is coupled to the summing junction 278, both directly and through a one-fourth clock period delay 282. The output of the summing junction 278 is coupled to a node 284.

With the compressed signal of FIG. 23B applied to the node 268, the one-half clock period delay 272 and the summing junction 274 function to provide interpolation so that the resolution of the signal of FIG. 23B is doubled. The resulting signal which appears at the node 276 is shown in FIG. 23C. The resolution of the signal can be increased even further by utilizing the delays 280 and 282 and the summing junction 278. In that event, a signal having four times the resolution of the compressed signal of FIG. 23B is produced at the node 284, as shown in FIG. 23D.

While the invention has been particularly shown and described with reference to preferred embodiments thereof, it will be understood by those skilled in the art that various changes in form and details may be made therein without departing from the spirit and scope of the invention.

What is claimed is:

1. An arrangement for modifying the bandwidth of an analog input signal comprising the combination of means for periodically examining the analog input signal within a sampling region encompassing a first plurality of values of the analog input signal and within a subsampling region encompassing a second plurality of values of the analog input signal within a portion of the sampling region, and means responsive to each examining of the analog input signal for providing a corresponding output signal representing the second plurality of values within the subsampling region and related to those of the first plurality of values not included in the second plurality of values.

2. The invention set forth in claim 1, further comprising an arrangement for expanding the bandwidth of the output signals including means responsive to each output signal for generating corresponding values using interpolation and extrapolation.

3. The invention set forth in claim 1, wherein each output signal is related to those of the first plurality of values not included in the second plurality of values by denoting a trend represented by those of the first plurality of values not included in the second plurality of values.

4. The invention set forth in claim 1, wherein the analog input signal is comprised of a one-dimensional succession of analog values, the sample region comprises n+r of the succession of analog values, the subsample region comprises n of the succession of analog values and the analog input signal is examined at intervals of n analog values.

5. The invention set forth in claim 4, wherein n=2 and r=4.

6. The invention set forth in claim 1, wherein the analog input signal is comprised of a three-dimensional array of successive analog values, the subsample region is comprised of k analog values in a first direction of the three-dimensional array, 1 analog values in a second direction of the three-dimensional array orthogonal to the first direction, and m analog values in a third direction of the three-dimensional array orthogonal to the first direction and to the second direction, and the sample region is comprised of k+r analog values in the first direction, 1+r analog values in the second direction, and m analog values in the third direction.

7. The invention set forth in claim 6, wherein k=1=1, r=3 and m=3.

8. The invention set forth in claim 1, wherein the analog input signal is comprised of a two-dimensional array of successive analog values, the subsample region is comprised of k analog values in a first direction of the two-dimensional array and 1 analog values in a second direction of the two-dimensional array orthogonal to the first direction, and the sample region is comprised of k+r analog values in the first direction and 1+r analog values in the second direction.

9. The invention set forth in claim 8, wherein k=1=n so that the subsample region is comprised of $n^2$ of the analog values and the sample region is comprised of $(n+r)^2$ of the analog values.

10. The invention set forth in claim 9, wherein n=2 and r=4.

11. An arrangement for compressing the bandwidth of a video signal occurring as a succession of frames of pixel values, comprising the combination of means responsive to the occurrence of each of the succession of frames for undergoing a single scanning of the entire frame as it occurs, means responsive to the single scanning of each frame as it occurs for generating output signals representing the values of pixels within a succession of like sampling regions within the frame, the output signals comprising a bandwidth compressed video signal, wherein each of the succession of the like sampling regions has a subsampling region therein, and the means for generating output signal is operative to generate a different output signal for each subsampling region, the output signal having a value representing the pixels within the subsampling region and a trend in pixel values denoted by the pixels outside of the subsampling region but within the sampling region.

12. A synthesizer for enhancing an image comprises the combination of means for isolating a selective portion of the image for processing and means for expanding the isolated selected portion of the image in accordance with a subsampling algorithm to provide an enhanced image, wherein the image has a given aspect ratio and the means for expanding is operative to provide the enhanced image with an aspect ratio different from the given aspect ratio.

13. The invention set forth in claim 12, wherein the means for expanding is operative to expand the isolated selected portion of the image by a factor of 3 in each of 2 orthogonal directions.

14. A synthesizer for enhancing an image comprising the combination of means for isolating a selective portion of the image for processing and means for expanding the isolated selected portion of the image in accordance with a subsampling algorithm to provide an enhanced image, wherein the means for expanding is operative to expand the isolated selected portion of the image by a factor of 5:2 in each of 2 orthogonal directions.

15. An arrangement for providing bandwidth modification of an analog signal comprising the combination of means for converting the analog signal to a digital signal, means for temporarily storing the digital signal, means for identifying values of the digital signal within a sampling region, means for converting the values of the digital signal within the sampling region to analog values, and means for providing an output signal having a value determined by those of the analog values within a subsampling region within the sampling region and influenced by the remaining analog values within the sampling region.

16. The invention set forth in claim 15, wherein the means for temporarily storing the digital signal comprises a memory capable of storing at least one line of digital values and the means for identifying values comprises means for addressing the digital values stored in the memory within a succession of the subsampling regions.

17. The invention set forth in claim 16, wherein the memory is capable of storing a plurality of lines of an image raster and the means for addressing comprises an address generator for generating addresses within the memory corresponding to the succession of the subsampling regions, an end-of-line circuit for generating subsampling region addresses within the memory at the ends of the plurality of lines of the image raster and a bottom-of-raster circuit for generating subsampling region addresses within the memory at the bottom of the image raster.

18. The invention set forth in claim 15, wherein the means for providing an output signal comprises a neural network.

19. The invention set forth in claim 18, wherein the means for converting the analog signal to a digital signal comprises an analog to digital converter, the means for temporarily storing the digital signal comprises a random access memory, the means for identifying values of the digital signal within a sampling region comprises an address generator, the means for converting the values of the digital signal within the sampling region to analog values comprises a digital to analog converter, and further including a sample and hold memory coupled between the digital to analog converter and the neural network for temporarily storing analog values from the digital to analog converter.

20. The invention set forth in claim 18, wherein the arrangement provides bandwidth compression and the neural network is operative to generate a single value corresponding to the analog values within each subsampling region.

21. The invention set forth in claim 18, wherein the arrangement provides bandwidth expansion and the neural network is operative to generate plural values that comprise each subsampling region in response to each analog value from the means for converting the values of the digital signal within the sampling region to analog values.

22. A synthesizer for converting a standard video signal having horizontal and vertical synchronizing signals into a high definition video signal comprising the combination of means for converting the standard video signal into a digital signal, a memory for storing the digital signal, means for converting digital signals stored in the memory into analog signals, means for temporarily storing the analog signals, a neural network coupled to the means for temporarily storing and operative to expand each analog signal in the means for temporarily storing into a plurality of analog values in accordance with an algorithm to provide a high definition video signal, and an address generator responsive to the horizontal and vertical synchronizing signals for addressing a succession of different locations within the memory.

23. The invention set forth in claim 22, wherein the standard video signal comprises a succession of frames, each being comprised of 525 total lines and 483 active lines, the address generator is operative to address 362 of the 483 active lines, and the high definition video signal comprises a succession of frames, each being comprised of 1125 total lines and 1080 active lines.

24. The invention set forth in claim 22, wherein the standard video signal has an aspect ratio of 4:3 and the high definition video signal has an aspect ratio of 16:9.

25. An arrangement for compressing an analog signal comprising the combination of means for identifying values of the analog signal within a sampling region and within a sub-sampling region within the sampling region, and a neural network for providing a compressed output signal determined by values of the analog signal within the sub-sampling region and influenced by values of the analog signal within the sampling region and outside of the sub-sampling region.

26. The invention set forth in claim 25, wherein the means for identifying values is operative to periodically identify the values of the analog signal within a sampling region and a sub-sampling region as the analog signal occurs.

27. The invention set forth in claim 25, further including an arrangement for expanding the compressed output signal comprising means for identifying the values of successive samples of the compressed output signal, and a second neural network for providing expanded output signals in response to the successive samples.

28. The invention set forth in claim 27, wherein the first-mentioned neural network provides the compressed output signal by implementing a sub-sampling algorithm, and the second neural network provides expanded output signals by implementing essentially a reverse of the sub-sampling algorithm.

29. An arrangement for decompressing an analog signal comprising the combination of means for identifying the values of successive samples of the analog signal, and means for providing expanded output signals in response to the successive samples by implementing a sub-sampling algorithm.

30. The invention set forth in claim 29, wherein the sub-sampling algorithm includes interpolation and extrapolation using the successive samples.

31. The invention set forth in claim 29, wherein the means for providing successive samples comprises a neural network.

* * * * *